US012462722B2

(12) United States Patent
Serizawa et al.

(10) Patent No.: US 12,462,722 B2
(45) Date of Patent: Nov. 4, 2025

(54) DEVICES AND METHODS FOR CONTROLLING PIXEL DATA PROCESSING

(71) Applicant: Synaptics Incorporated, San Jose, CA (US)

(72) Inventors: Orimitsu Serizawa, Tokyo (JP); Sosuke Tsuji, Tokyo (JP); Yuri Naka, Tokyo (JP)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 18/441,235

(22) Filed: Feb. 14, 2024

(65) Prior Publication Data

US 2025/0259581 A1 Aug. 14, 2025

(51) Int. Cl.
*G09G 3/20* (2006.01)

(52) U.S. Cl.
CPC ... *G09G 3/2003* (2013.01); *G09G 2300/0452* (2013.01); *G09G 2310/027* (2013.01); *G09G 2320/0276* (2013.01); *G09G 2320/0673* (2013.01); *G09G 2360/16* (2013.01); *G09G 2370/04* (2013.01)

(58) Field of Classification Search
CPC ..... G09G 2300/0452; G09G 2310/027; G09G 2320/0276; G09G 2320/0673; G09G 2360/16; G09G 2370/04; G09G 3/2003
See application file for complete search history.

(56) References Cited

U.S. PATENT DOCUMENTS

2016/0163286 A1* 6/2016 Yang .................... G09G 3/2011 345/690

* cited by examiner

*Primary Examiner* — Yaron Cohen

(74) *Attorney, Agent, or Firm* — Leydig, Voit & Mayer, Ltd.

(57) ABSTRACT

A display system includes a sender and a display driver. The sender is configured to provide first extended pixel data for a first pixel. The first extended pixel data includes first pixel data and a first process select bit. The display driver is configured to receive the first extended pixel data. The display driver is further configured to apply, based on the first process select bit, one or more first processes to the first pixel data, and drive a display panel based on the first extended pixel data.

21 Claims, 27 Drawing Sheets

| Image Type | Base Image | Icon |
|---|---|---|
| Process Select Bit | "0" | "1" |
| Gamma Setting | Gamma Setting A | Gamma Setting B |
| Image Process | ON | OFF |

FIG. 6

| Image Type | Base Image | Icon |
|---|---|---|
| Process Select Bit | "0" | "1" |
| Gamma Setting | Gamma Setting A | Gamma Setting B |
| Image Process | ON | OFF |
| Error Correction/ Detection | OFF | ON |

FIG. 13

| Item | | Base Image | Icon Type #1 | Icon Type #2 | Guide Scale | Back Monitor | Side Monitor |
|---|---|---|---|---|---|---|---|
| | Process Select Bit | "0" | "1" | "1" | "1" | "1" | "1" |
| | Additional Process Select Bits md[2:0] | N/A | "000" | "001" | "010" | "100" | "101" |
| GAMMA | Gamma Setting | Gamma Setting A | Gamma Setting B | Gamma Setting C | Gamma Setting D | Gamma Setting E | Gamma Setting F |
| FC#1 | Image Process #1 | ON | OFF | OFF | OFF | ON | ON |
| FC#2 | Image Process #2 | ON | OFF | OFF | OFF | OFF | OFF |
| FC#3 | Image Process #3 | ON | OFF | OFF | OFF | ON | ON |
| | ⋮ | | | ⋮ | | | |
| EC/D | Error Correction/ Detection | OFF | ON | ON | OFF | OFF | OFF |

FIG. 17

DEVICES AND METHODS FOR CONTROLLING PIXEL DATA PROCESSING

TECHNICAL FIELD

This disclosure relates generally to display devices, and more particularly to devices and methods for controlling processes applied to pixel data of display images.

BACKGROUND

A display image displayed on a display device (e.g., an automotive instrument panel, a smartphone display, a computer monitor, or other type of display) may be rendered by overlaying various types of image elements on a base image (or a background image). In automotive instrument panel applications, for example, image elements contained in display images may include icons, indicators, guidance markers, monitoring images captured by imaging devices (e.g., cameras), still images, video images, and so on.

In order to improve image quality, various processes (e.g., color adjustment, contrast correction, brightness correction, gamma transformation (or gamma correction), and other image processes) may be applied to pixel data of the display image. In implementations where the display image contains various types of image elements, it may be desired to adjust the processes applied to respective image elements depending on the types of image elements to improve the visibility and/or appearance of the image elements, because visual characteristics (e.g., such as tone of color (or hue), brightness, contrast, size, etc.) of the image elements may vary depending on the types of the image elements.

In panel display devices, such as liquid crystal display (LCD) devices, organic light emitting diode (OLED) display devices, and micro light emitting diode (μLED) display devices, processes for image quality enhancement may be performed by a display driver (e.g., a display driver integrated circuit (DDIC)) that drives the display panel. In such implementations, one method of applying a desired process to pixel data of each image element is to store location and size information of each image element in the display driver and apply the desired process to the pixel data of that image element based on the stored location and size information. However, this scheme may suffer from a lack of flexibility of the shapes, locations, and/or sizes of the image elements. Detailed location and size information may be required to display an image element with a complex shape, and it may be impractical to store detailed location and size information for each image element in the display driver. Accordingly, there is a technical need to improve the flexibility in the definition (e.g., the shape, location, and/or size) of each image element contained in the display image.

SUMMARY

This summary is provided to introduce, in a simplified form, a selection of concepts that will be further described below. This summary is not necessarily intended to identify key features or essential features of the present disclosure. The present disclosure may include the following various aspects and embodiments.

In an exemplary embodiment, the present disclosure provides a display system. The display system includes a sender and a display driver. The sender is configured to provide first extended pixel data for a first pixel. The first extended pixel data includes first pixel data and a first process select bit. The display driver is configured to receive the first extended pixel data. The display driver is further configured to apply, based on the first process select bit, one or more first processes to the first pixel data and to drive a display panel based on the first extended pixel data.

In another exemplary embodiment, the present disclosure provides a display driver. The display driver includes an interface, a pixel data processing circuit, and a driver circuit. The interface is configured to receive first extended pixel data for a first pixel. The first extended pixel data includes first pixel data and a first process select bit. The pixel data processing circuit is configured to apply, based on the first process select bit, one or more first processes to the first pixel data. The driver circuit is configured to drive a display panel based on the first extended pixel data.

In yet another exemplary embodiment, the present disclosure provides a method. The method includes providing first extended pixel data for a first pixel to a display driver. The first extended pixel data includes first pixel data and a first process select bit. The method further includes applying, by the display driver, one or more first processes to the first pixel data based on the first process select bit. The method further includes driving, by the display driver, a display panel based on the first extended pixel data.

Other features and aspects are described in more detail below with reference to the accompanying drawings.

BRIEF DESCRIPTION OF THE DRAWINGS

FIG. 6 is a table showing an example correlation between values of a process select bit contained in extended pixel data and corresponding processes to be applied to the pixel data contained in the extended pixel data, according to one or more embodiments.

FIG. 13 is a table showing an example correlation between values of the process select bit of extended pixel data and corresponding processes applied to the pixel data contained in the extended pixel data, according to one or more embodiments.

FIG. 17 is a table showing an example correlation between values of a process select bit and additional process select bits of extended pixel data and corresponding processes to be applied to the pixel data contained in the extended pixel data, according to one or more embodiments.

Figure 1A:
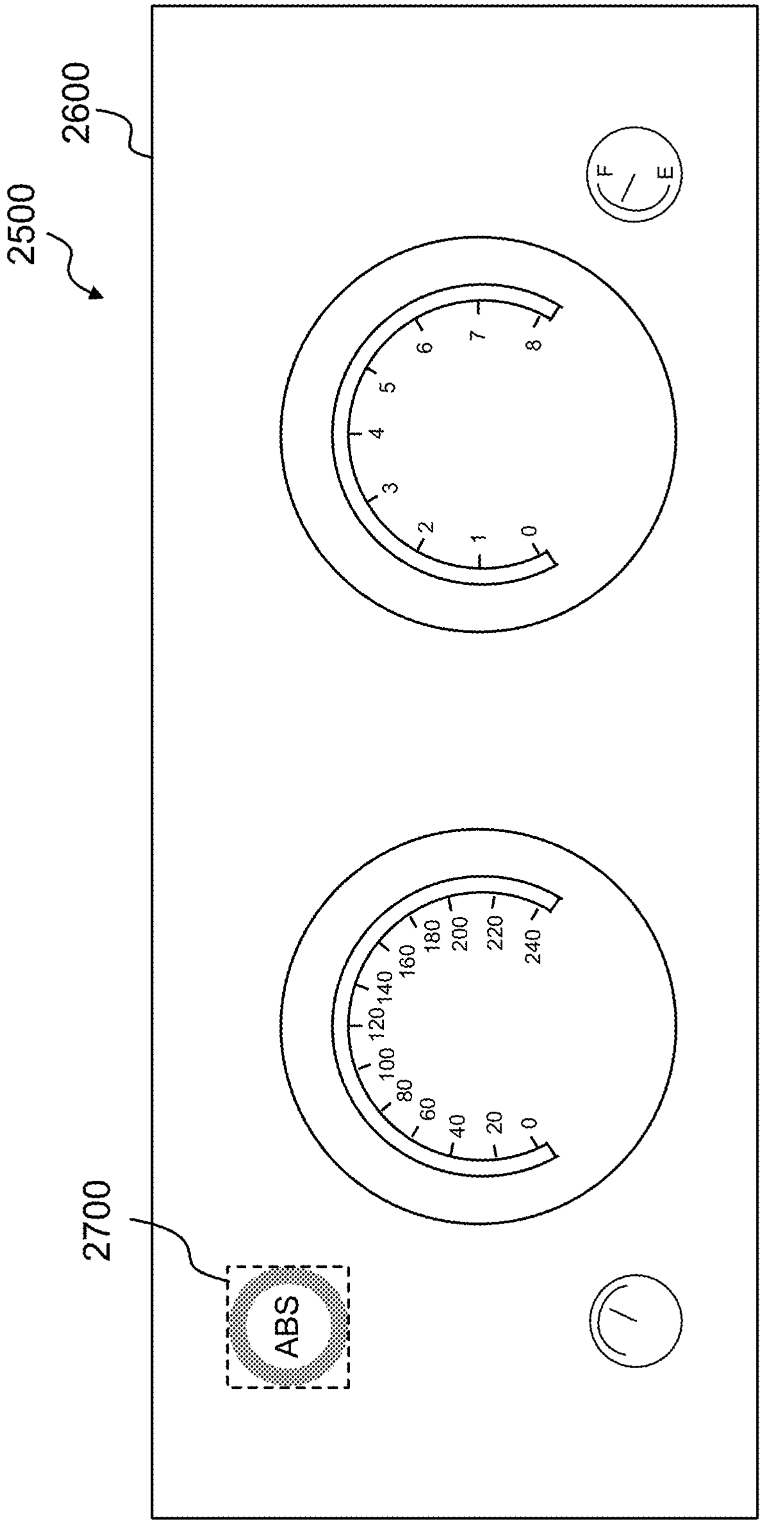
FIG. 1A shows an example display image rendered by overlaying an icon on a base image, according to one or more examples of the present disclosure.

For ease of understanding, where possible, identical reference numerals have been used, to designate elements that are common to the figures. It is contemplated that elements disclosed in one embodiment may be utilized in other embodiments without specific recitation. Suffixes may be appended to reference numerals to distinguish elements from one another. The drawings referenced herein are not be to be construed as being drawn to scale unless specifically noted. In addition, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A display driver configured to drive a display panel (e.g., an LCD panel, an OLED display panel, a μLED display panel) may be configured to apply various processes to pixel data of the display image to improve image quality. In implementations where the display image contains various types of image elements (e.g., base images, icons, indicators, guide markers, monitoring images, still images, video images, etc.), it is desired to adjust the processes applied to the respective image elements depending on the types of image elements to improve the visibility and/or appearance of the image elements, since the visual characteristics of the image elements may vary depending on the types of the image elements.

One method of applying a desired process to pixel data of each image element is to store location and size information of each image element in the display driver and apply the desired process to the pixel data of that image element based on the stored location and size information. In a typical implementation, the display driver may be configured to determine, based on the stored location and size information, processes to be applied to the pixel data of respective pixels in the respective image elements.

Figure 1B:
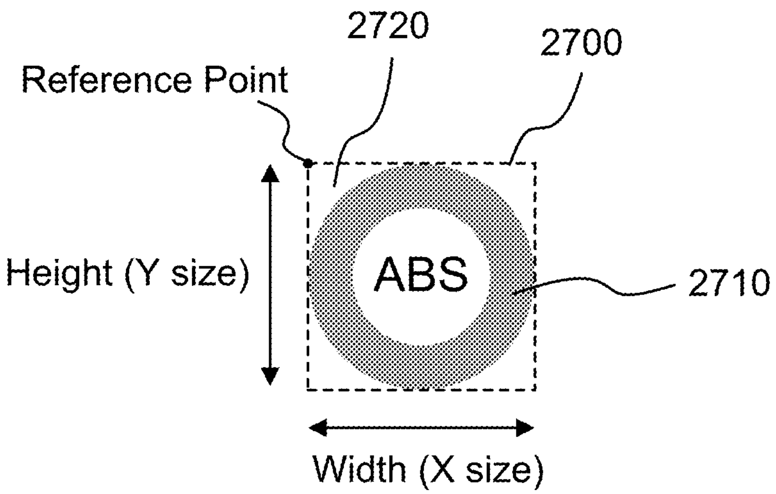
FIG. 1B shows an example of location and size information of an icon, according to one or more examples of the present disclosure.

FIG. 1A shows an example display image 2500 rendered by overlaying an icon 2700 on a base image 2600. The icon referred to herein is a small pictogram that visually represents an object, an indication, an action, a symbol, or other concept. In the shown embodiment, the display image 2500 is an image for an automotive instrument panel. To improve the visibility and/or appearance of the icon 2700, the display driver may be configured to apply different processes to the base image 2600 and the icon 2700 based on the location and size information of the icon 2700. FIG. 1B shows an example of the location and size information of the icon 2700. In this example, the icon 2700 has a rectangular shape and contains an icon body 2710 and a transparent background 2720. The location and size information of the icon 2700 may include the location of the reference point (the upper left corner in this example), the vertical height (or Y size), and the horizontal width (or X size). The display driver may be configured to refer to the location and size information of the icon 2700 to appropriately select (or control) processes applied to pixel data of pixels in the icon 2700.

The process selection based on the location and size information stored in the display driver may however cause inflexibility of the shape, location, and/or sizes of the image elements. Detailed location and size information may be required to display an image element with a complex shape, and it may be impractical to store detailed location and size information for each image element in the display driver. Accordingly, in actual implementations, the shape of an image element is often limited to a rectangular shape. Further, it may be necessary to update the location and size information in order to adjust the location and/or size of an image element. Accordingly, there is a technical need to improve the flexibility in the definition (e.g., the shape, location, and/or size) of each image element contained in the display image.

The present disclosure presents pixel-based process selection (or adjustment) to improve the flexibility in the definition (e.g., the shape, location, and/or size) of each image element contained in the display image. In one or more embodiments, a display system includes a sender and a display driver configured to drive a display panel. The sender is configured to provide extended pixel data to the display driver. The extended pixel data for a pixel includes pixel data and a process select bit. The display driver is configured to apply, based on the process select bit, one or more processes to the pixel data. This scheme enables adjusting the process to be applied to each image element on a pixel-by-pixel basis, effectively improving the flexibility in displaying an image element in the display image. In the following, various embodiments of the present disclosure are described.

Figure 2:
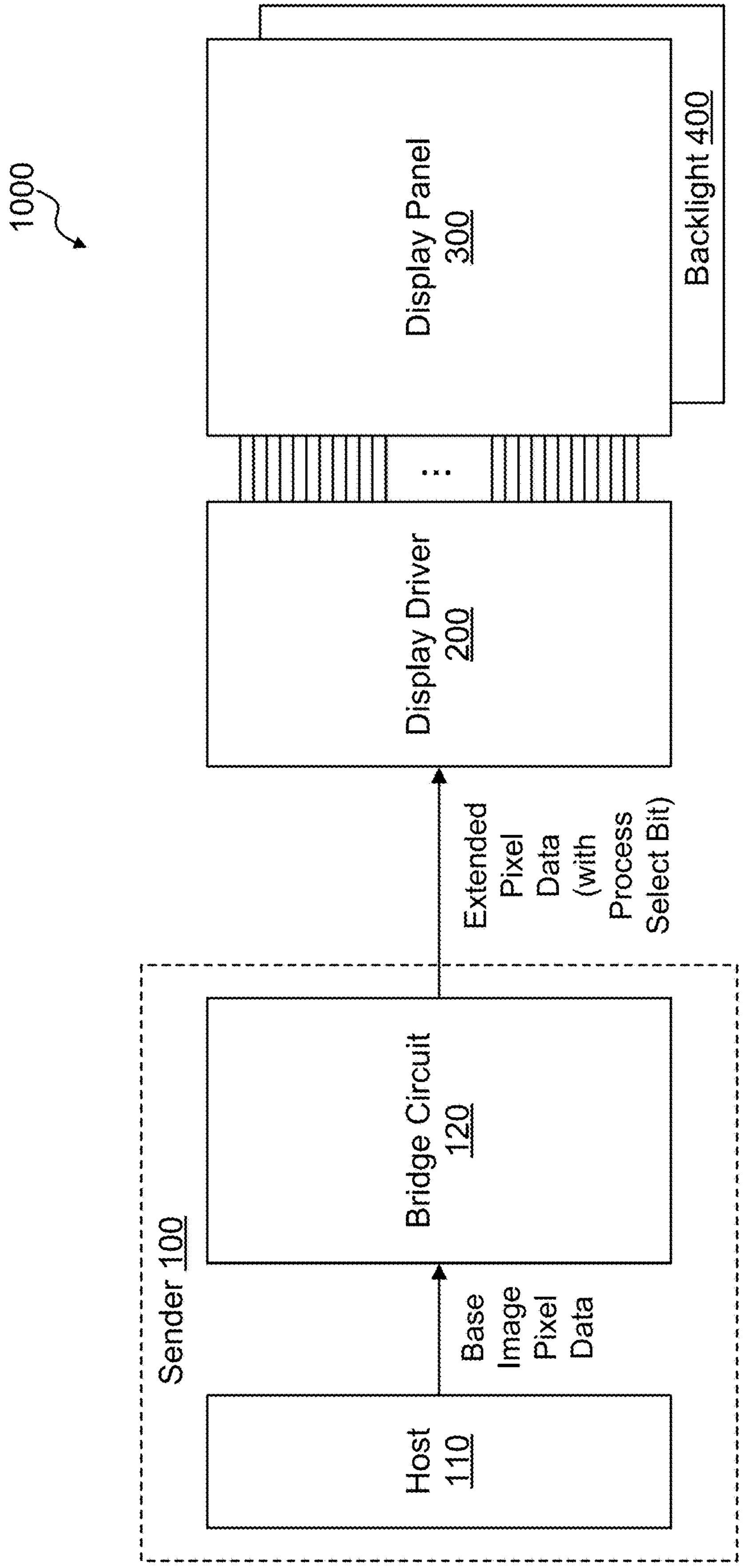
FIG. 2 is a block diagram showing an example configuration of a display system, according to one or more embodiments.

FIG. 2 is a block diagram showing an example configuration of a display system 1000, according to one or more embodiments. In the shown embodiment, the display system 1000 includes a sender 100, a display driver 200, and a display panel 300. The display driver 200 is configured to drive the display panel 300 to display a desired display image on the display panel 300. In some embodiments, the display panel 300 may be a light transmissive display panel, such as a liquid crystal display (LCD) panel, and the display system 1000 may further include a backlight 400 configured to illuminate the display panel 300. In other embodiments, the display panel 300 may be a self-luminous display panel, such as an organic light emitting diode (OLED) display panel and a micro light emitting diode (μLED) display panel. In such embodiments, the backlight 400 may be omitted from the display system 1000.

The sender 100 is configured to provide the display driver 200 with "extended" pixel data for the respective pixels of the display panel 300, and the display driver 200 is configured to drive the display panel 300 based on the "extended" pixel data. As used herein, the term "extended" refers to the inclusion of auxiliary information in addition to pixel data. More specifically, in one or more embodiments, the "extended" pixel data for a pixel includes pixel data of that pixel and a process select bit that controls image processing performed on the pixel data. The process select bit is used to achieve process adjustment on a pixel-by-pixel basis. In one or more embodiments, the display driver 200 is configured to apply, based on the process select bit, one or more processes to the pixel data. In some embodiments, the display driver 200 may be configured to generate processed pixel data by applying the one or more processes to the pixel data and drive the display panel 300 based on the processed pixel data.

In the shown embodiment, the sender 100 includes a host 110 and a bridge circuit 120. The host 110 is configured to generate base image pixel data corresponding to a base image. The bridge circuit 120 is configured to render the display image to be displayed on the display panel 300 by overlaying one or image elements such as icons on the base image and to generate the "extended" pixel data corresponding to the display image. It should be noted that each process relevant to the generation of the extended pixel data may be implemented by either the host 110 or the bridge circuit 120, or any other circuits disposed in the sender 100.

Figure 3:
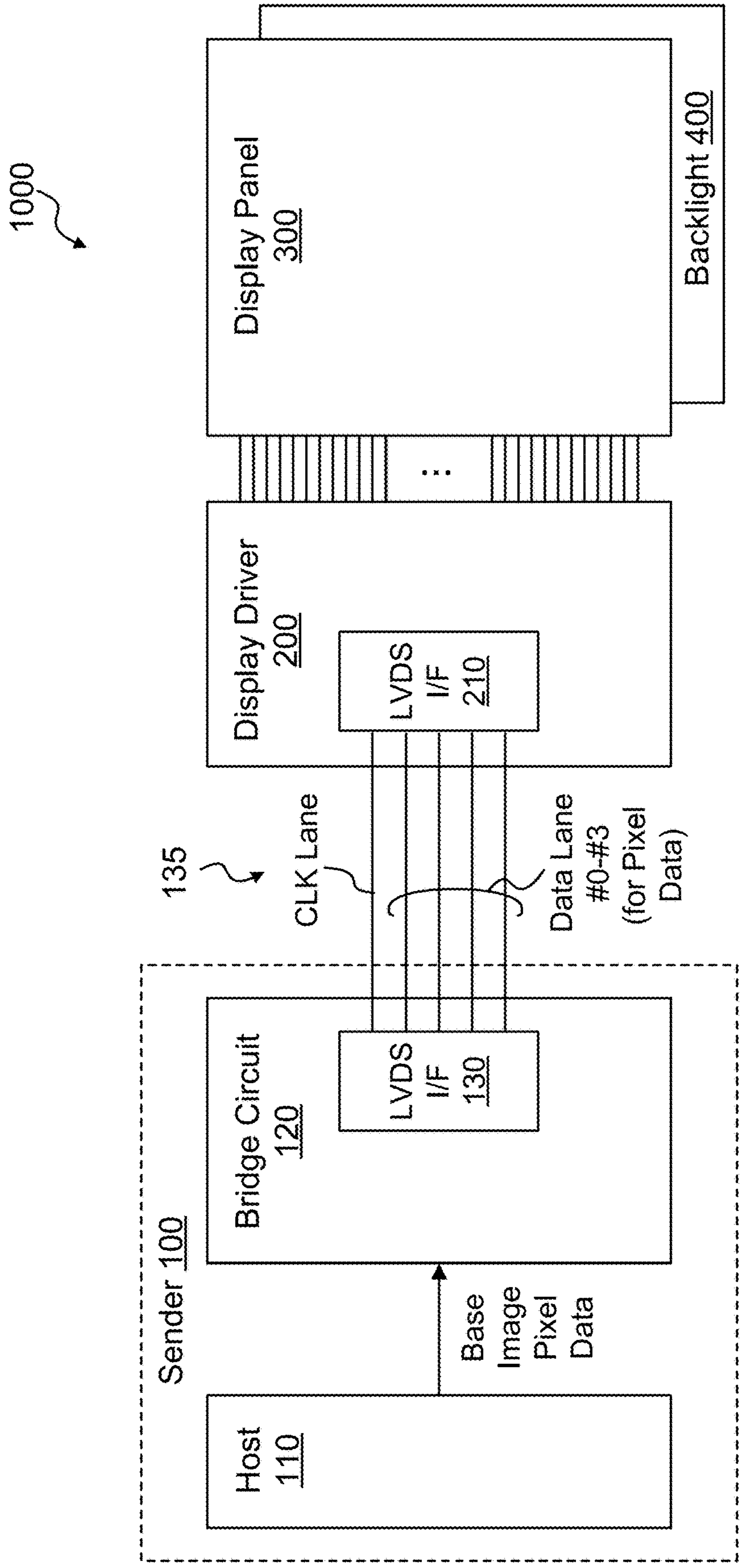
FIG. 3 is a block diagram showing an example configuration of a display system, according to one or more embodiments.

In one or more embodiments, low voltage differential signaling (LVDS), also known as Telecommunication Industries Association (TIA)/Electronic Industries Association (EIA)-644, may be used to transmit the "extended" pixel data from the sender 100 to the display driver 200. In such embodiments, as shown in FIG. 3, the sender 100 may include an LVDS interface (I/F) 130 and the display driver 200 may include an LVDS interface 210 coupled to the LVDS interface 130 via an LVDS link 135. In some embodiments, the LVDS interface 130 may be integrated within the bridge circuit 120. In other embodiments, the LVDS interface 130 may be disposed external to the bridge circuit 120. It should be noted that LVDS is a physical layer specification only, and therefore any desired data communication standard using the LVDS may be used for data communications between the sender 100 and the display driver 200.

In one or more embodiments, the data communications between the sender 100 and the display driver 200 may be implemented in accordance with the Japan electronic industry development association (JEIDA) format (also known as Format 1) or the video electronics standards association (VESA) format (also known as Format 2). In such embodiments, the LVDS link 135 may use one clock lane and four data lanes #0 to #3 for the data communications between the sender 100 and the display driver 200.

Figure 4A:
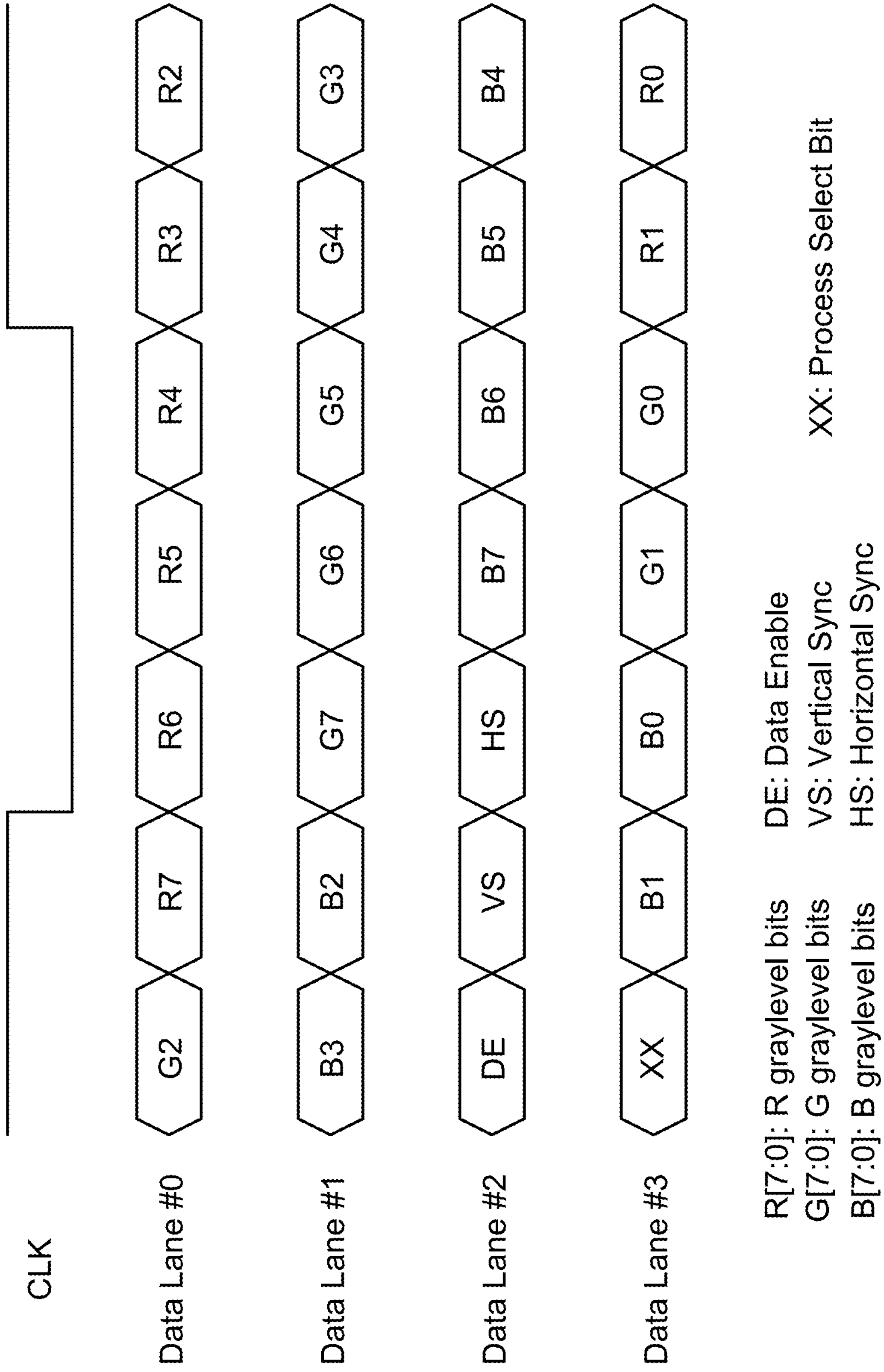
FIG. 4A shows an example mapping of data bits of extended pixel data for one pixel in implementations where the extended pixel data is transmitted in accordance with the JEIDA format, according to one or more embodiments.

FIG. 4A shows an example mapping of data bits of extended pixel data for one pixel in implementations where the extended pixel data is transmitted in accordance with the JEIDA format, according to one or more embodiments. In the shown embodiment, extended pixel data for one pixel is transmitted during one clock cycle. Extended pixel data for one pixel includes 24-bit pixel data in an RGB format that contains R graylevel bits R0-R7 (also referred to as R[7:0]), G graylevel bits G0-G7 (also referred to as G[7:0]), and B graylevel bits B0-B7 (also referred to as B[7:0]). In the shown embodiment, one clock cycle includes seven periods and one bit is transmitted over each of data lanes #0 to #3 during each of the seven periods. In addition, the JEIDA format requires that a data enable bit DE, a vertical synchronization bit VS, and a horizontal synchronization bit HS be transmitted during each clock cycle. The data enable bit DE may be set to "1" during clock cycles during which pixel data are transmitted to the display driver 200 as required by the JEIDA format because the value "1" of the data enable bit DE informs the display driver 200 that the pixel data are currently being transmitted. Further, as recommended by the JEIDA format, the vertical synchronization bit VS and the horizontal synchronization bit HS may be fixed to "1" during the clock cycles during which the pixel data are transmitted, although the operation of the display driver 200 is not dependent on the values of the vertical synchronization bit VS and the horizontal synchronization bit HS as long as the data enable bit DE is fixed to "1".

While the JEIDA format defines the bit "XX" transmitted over data lane #3 during the first period as a general-purpose bit, the embodiment shown in FIG. 4A uses the bit "XX" as the process select bit of the extended pixel data. It is noted that the process select bit XX is transmitted concurrently with the data enable bit DE during the first period of the clock cycle. The display driver 200 may be configured to apply, based on the process select bit "XX", one or more image processes to the 24-bit pixel data.

Figure 4B:
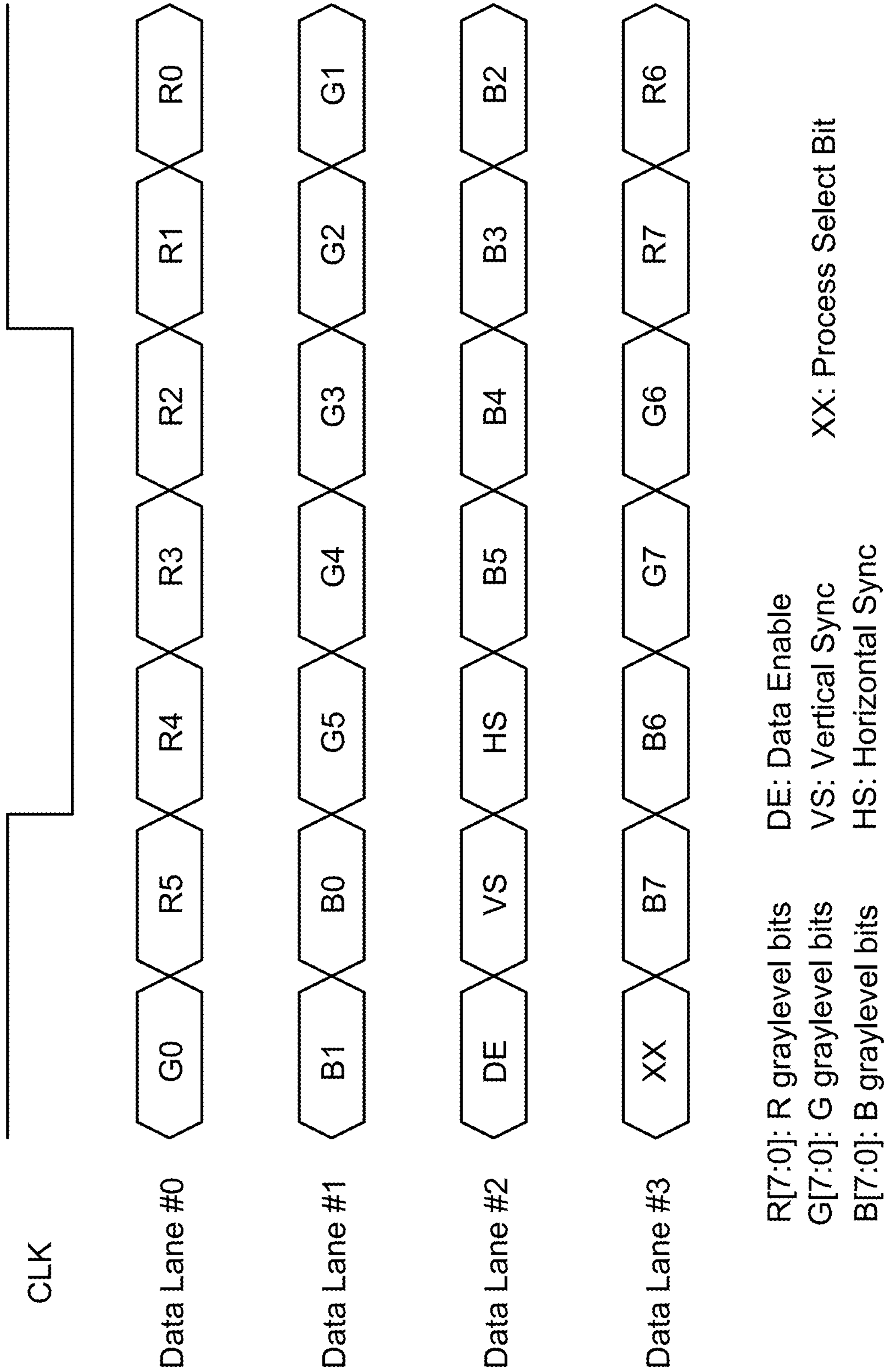
FIG. 4B shows an example mapping of data bits of extended pixel data for one pixel in implementations where the extended pixel data is transmitted in accordance with the VESA format, according to one or more embodiments.

FIG. 4B shows an example mapping of data bits of extended pixel data for one pixel in implementations where the extended pixel data is transmitted in accordance with the VESA format, according to one or more embodiments. The data bit mapping of 24-bit pixel data to the data lines #0 to

#3 in the VESA format is different than the data bit mapping shown in FIG. 4A. While the VESA format also defines the bit "XX" transmitted over data lane #3 during the first period of the clock cycle as a general-purpose bit, the embodiment shown in FIG. 4B also uses the bit "XX" as the process select bit of the extended pixel data. It should be noted that the process select bit XX is transmitted concurrently with the data enable bit DE also in the embodiment shown in FIG. 4B.

In other embodiments, data communication standards other than the JEIDA format and the VESA format may be used to transmit extended pixel data. In such embodiments, the data bit mapping of the extended pixel data to the data lanes may be adjusted accordingly.

Figure 5:
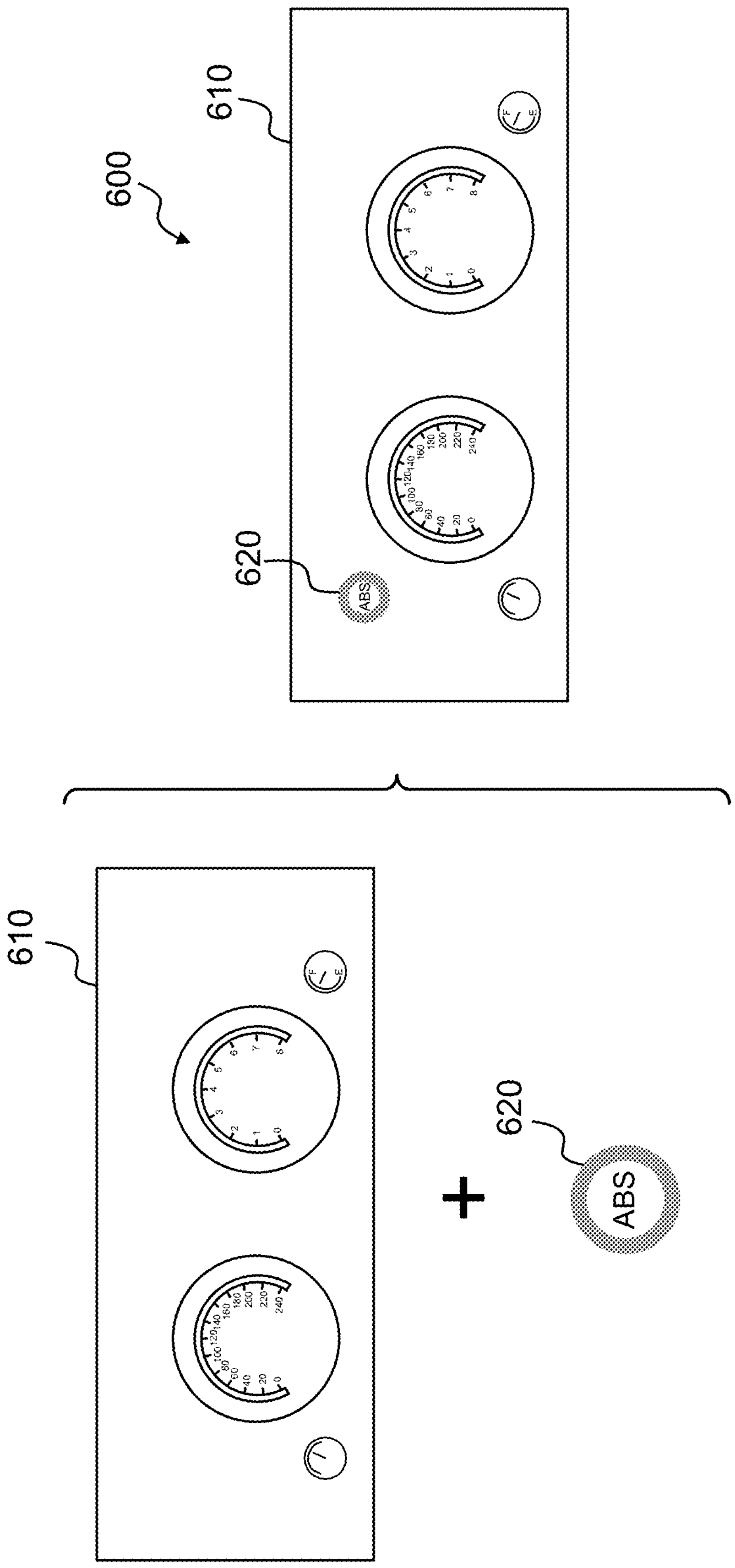
FIG. 5 shows an example display image rendered by a sender, according to one or more embodiments.

In one or more embodiments, the sender 100 may be configured to render a display image by overlaying a base image with one or more image elements. FIG. 5 shows an example display image 600 rendered by the sender 100, according to one or more embodiments. In the shown embodiment, the display image 600 is rendered by overlaying an icon 620 on a base image 610. Although only one icon 620 is shown in FIG. 5, the display image 600 may contain two or more icons. When the display image 600 is displayed on the display panel 300, the sender 100 is configured to provide extended pixel data of the respective pixels of the display image 600.

FIG. 6 is a table showing an example correlation between values of the process select bit contained in extended pixel data and corresponding processes to be applied to the pixel data contained in the extended pixel data in implementations where the display image is rendered by overlaying one or more icons on a base image, according to one or more embodiments. In the shown embodiment, the value of the process select bits of the extended pixel data for the base image is "0" while the value of the process select bits of the extended pixel data for the icons is "1". The display driver 200 is configured to refer to the process select bits of the extended pixel data of the respective pixels in the display image to select, based on the process select bits, processes to be applied to the pixel data of the extended pixel data.

In the shown embodiment, the display driver 200 is configured to apply a gamma transformation (or gamma correction) to the pixel data contained in the extended pixel data with a gamma setting selected based on the value of the process select bit. As used herein, the "gamma setting" is a setting that defines the input-to-output characteristics of the gamma transformation. The "gamma setting" may include the gamma value, which is a parameter that defines the gamma transformation. In the shown embodiment, the display driver 200 is configured to apply a gamma transformation to the pixel data with "gamma setting A" in response to the process select bit being "0" and with "gamma setting B" in response to the process select bit being "1". As a result, the gamma transformation with "gamma setting A" is applied to the pixel data for the base image (i.e., the display image other than the one or more icons), and the gamma transformation with "gamma setting B" is applied to the pixel data for the one or more icons. In some embodiments, the gamma setting "B" is preset to be suitable for the one or more icons.

The display driver 200 is further configured to apply an image process (e.g., color adjustment, contrast correction, brightness correction and other image processes) to the pixel data, in response to the process select bit being "0". The display driver 200 is further configured not to apply the image process in response to the process select bit being "1". This result in that the image process is applied to the pixel data for the base image and is not applied to the pixel data for the one or more icons.

Figure 7:
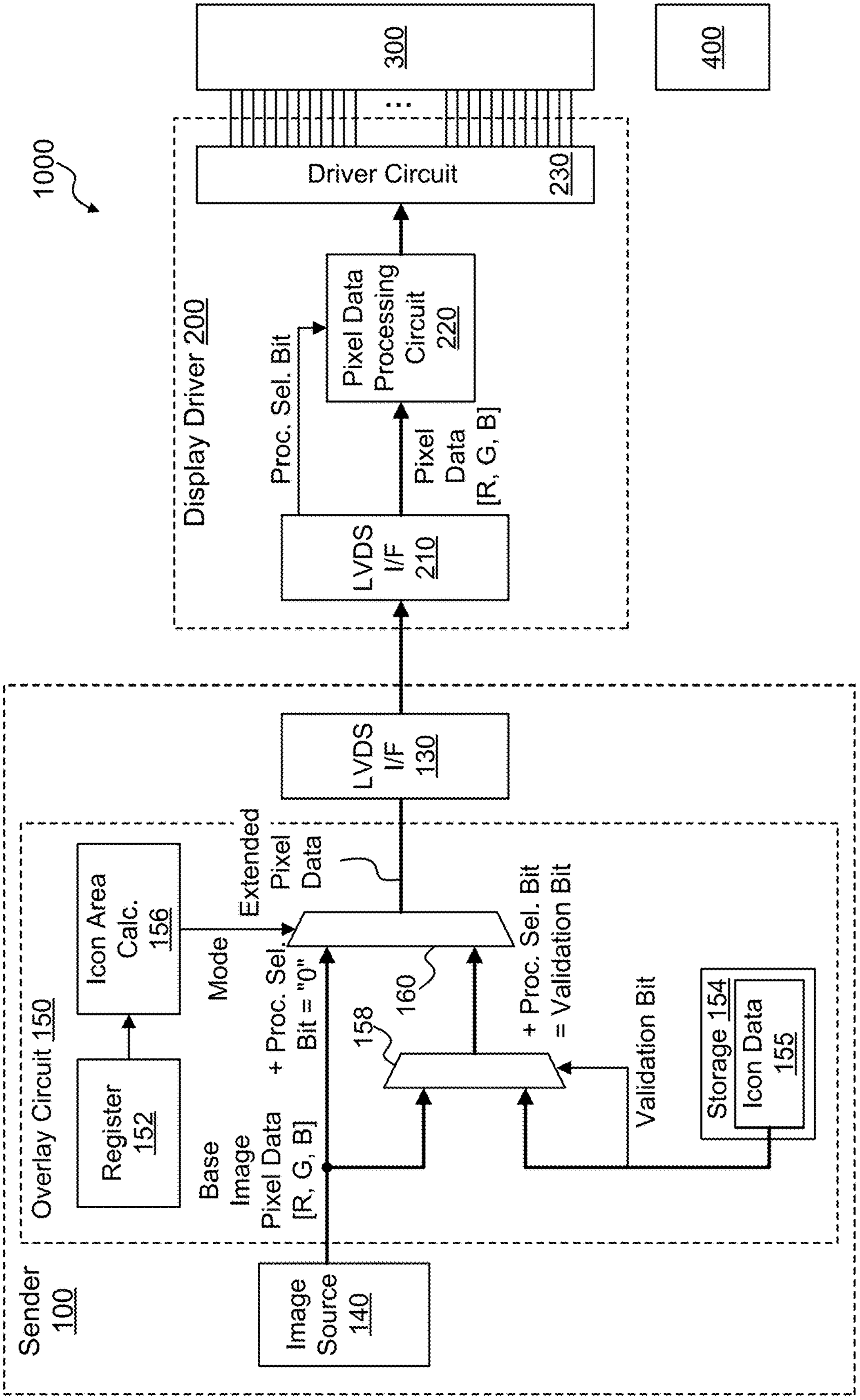
FIG. 7 is a block diagram showing example configurations of a sender and a display driver, according to one or more embodiments.

FIG. 7 is a block diagram showing example configurations of the sender 100 and the display driver 200 to implement the process selection shown in FIG. 6, according to one or more embodiments. In the shown embodiment, the sender 100 includes an image source 140 and an overlay circuit 150 in addition to the LVDS interface 130. The image source 140 is configured to provide base image pixel data corresponding to a base image to the overlay circuit 150. The overlay circuit 150 is configured to process the base image pixel data to render a display image in which one or more icons are overlaid on the base image, thereby generating extended pixel data of the display image. As discussed above, the extended pixel data includes pixel data and a process select bit for each pixel. The LVDS interface 130 is configured to transmit the extended pixel data to the display driver 200. It should be noted that the locations of the image source 140 and the overlay circuit 150 in the sender 100 may vary depending on implementations. In some implementations, the image source 140 may be located in the host 110 shown in FIG. 2 while the overlay circuit 150 may be located in the bridge circuit 120. In other implementations, both of the image source 140 and the overlay circuit 150 may be located in the host 110.

In the shown embodiment, the overlay circuit 150 includes a register 152, a storage 154, an icon area calculation circuit 156, a first selector 158, and a second selector 160. The register 152 is configured to store icon definition information indicative of the location and size of each icon which is to be overlaid on the base image. The icon area calculation circuit 156 is configured to generate, based on the icon definition information, a mode signal that indicates whether the pixel data that is currently being processed corresponds to a pixel of an icon. The mode instruction is indicated by "Mode" in FIG. 7.

Figure 8:
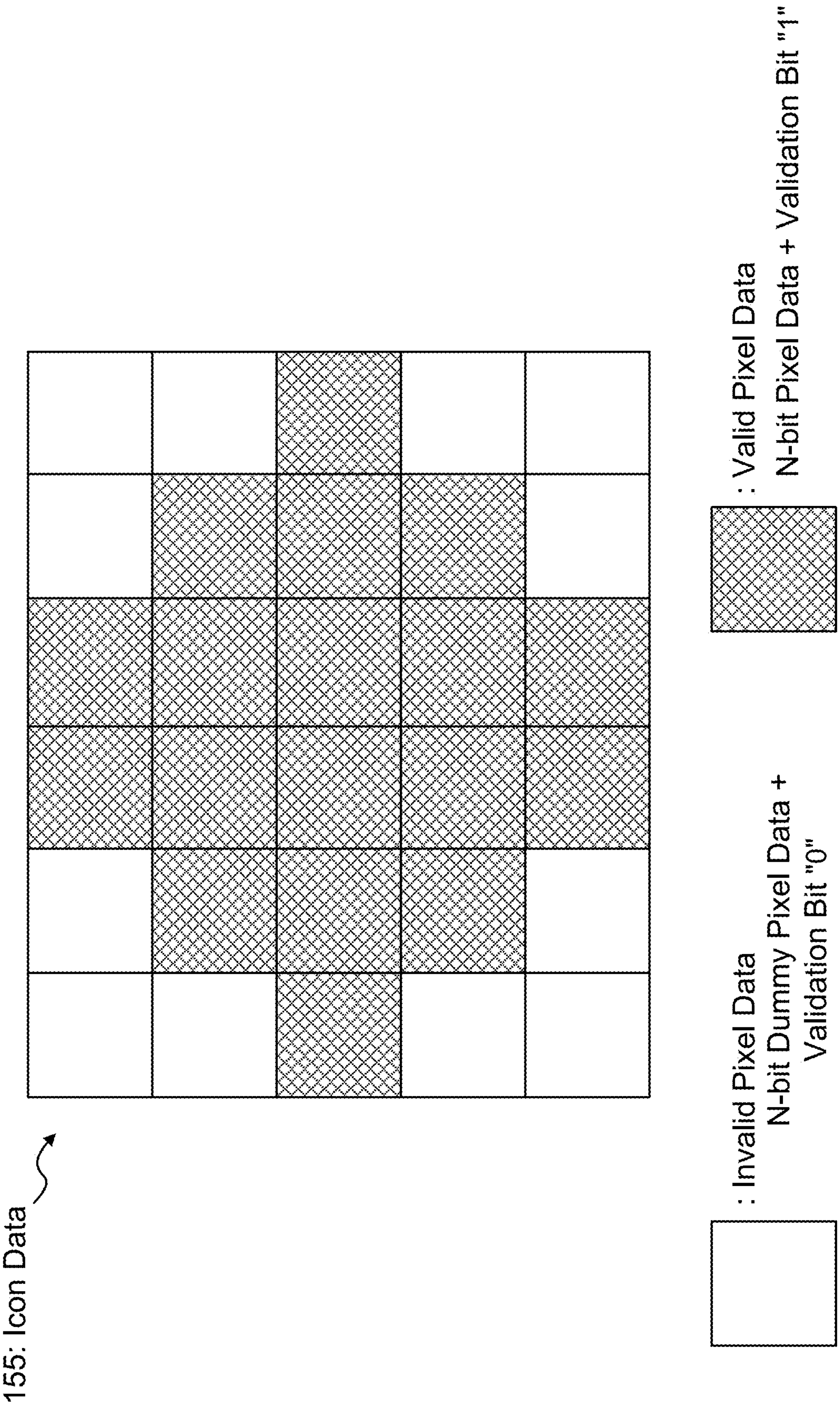
FIG. 8 shows an example format of icon data of an icon, according to one or more embodiments.

The storage 154 is configured to store icon data 155 of each icon to be overlaid on the base image. FIG. 8 shows an example format of icon data 155 of an icon, according to one or more embodiments. In the shown embodiment, the icon data 155 includes pixel data of pixels of a rectangular region that circumscribes the icon. It should be noted that the icon may have a shape other than rectangular. The icon data 155 includes "valid" pixel data for each pixel of the icon and "invalid" pixel data for each pixel that is within the rectangular region but outside the icon. The valid pixel data includes N-bit pixel data and a validation bit of "1", while the invalid pixel data includes N-bit dummy pixel data and a validation bit of "0". The validation bit indicates whether the corresponding pixel data is to be incorporated in the extended pixel data. In one implementation, if the validation bit for a pixel is "1", the corresponding pixel data is incorporated in the extended pixel data, otherwise the corresponding pixel data is not incorporated in the extended pixel data.

Referring back to FIG. 7, the first selector 158 and the second selector 160 are collectively configured to generate extended pixel data by partially replacing the base image pixel data with the "valid" pixel data of the icon data 155 based on the validation bits of the icon data 155 and the mode signal received from the icon area calculation circuit 156. When base image pixel data for a pixel of interest is provided to the overlay circuit 150, the first selector 158 is configured to receive the corresponding pixel data and the validation bit of the icon data 155 and to select the base image pixel data or the pixel data of the icon data 155 based on the validation bit. The first selector 158 is further configured to output the selected pixel data to the second selector 160. The second selector 160 is configured to select the base image pixel data or the pixel data received from the first selector 158 (which may be pixel data of the icon data 155), based on the mode signal, which indicates whether the pixel data for the pixel of interest corresponds to a pixel of an icon. The second selector 160 is further configured to determine the value of the process select bit of the extended pixel data for the pixel of interest and to generate extended pixel data by appending the process select bit to the selected pixel data. In the shown implementation, the second selector 160 is configured to determine the process select bit to be "0" when selecting the base image pixel data and to determine the process select bit to be equal to the validation bit when selecting the pixel data received from the first selector 158. As a result, the process select bit is set to "1" when the pixel of interest is one of the pixels of an icon, and otherwise, the process select bit is set to "0". The extended pixel data thus generated is transmitted to the LVDS interface 130 and then to the LVDS interface 210 of the display driver 200.

The display driver 200 includes a pixel data processing circuit 220 and a driver circuit 230. The pixel data processing circuit 220 is configured to receive from the LVDS interface 210 the extended pixel data, which includes pixel data and a process select bit for each pixel, and to process the pixel data of each pixel based on the process select bit as shown in FIG. 6.

Figure 9:
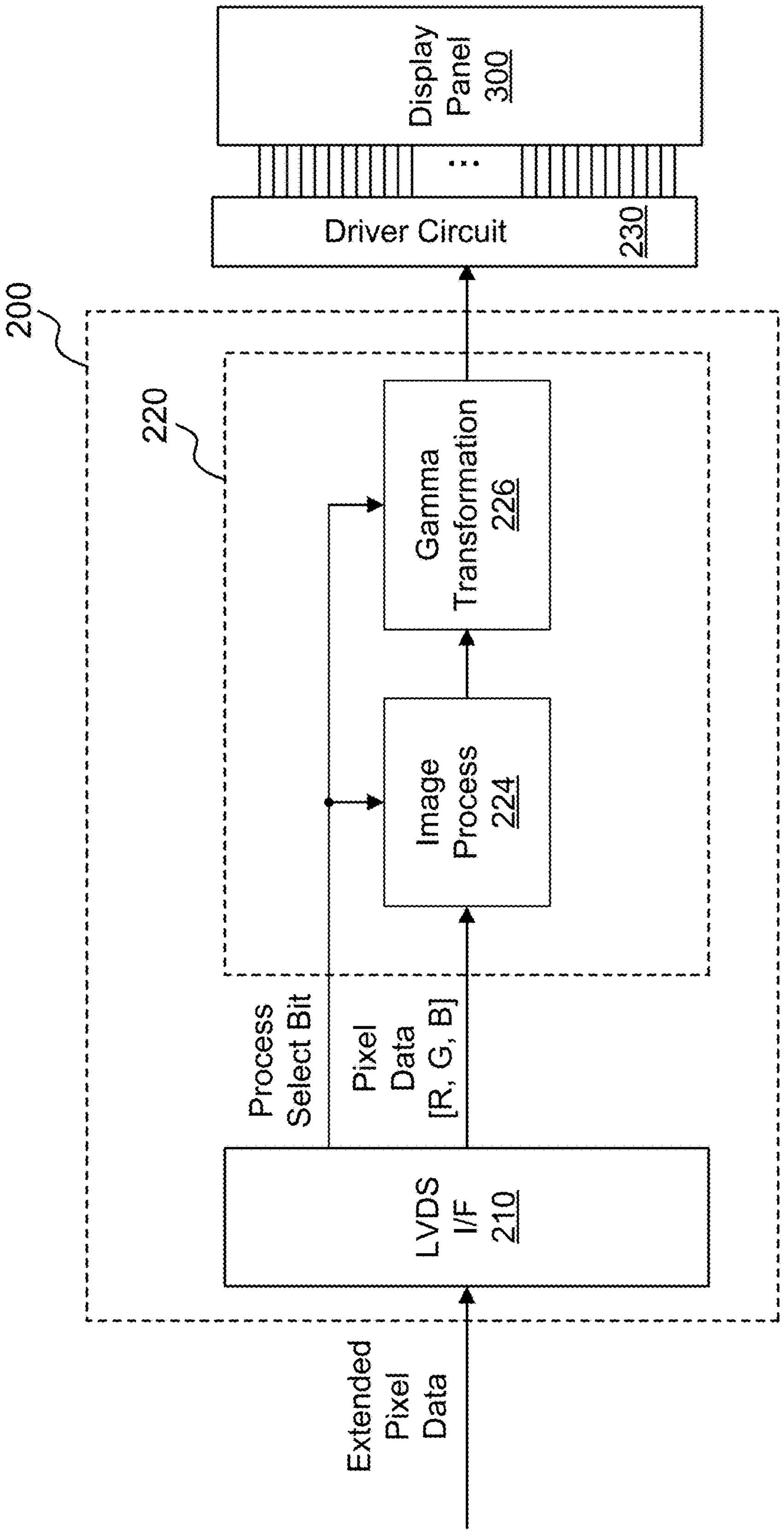
FIG. 9 shows an example configuration of a pixel data processing circuit, according to one or more embodiments.

FIG. 9 shows an example configuration of the pixel data processing circuit 220, according to one or more embodiments. In the shown embodiment, the pixel data processing circuit 220 includes an image processing block 224, and a gamma transformation block 226.

The image processing block 224 is configured to apply an image process to the pixel data of each pixel based on the value of the corresponding process select bit. The image process performed by the image processing block 224 may include, but is not limited to, color adjustment, contrast correction, brightness correction, and other image processes. In one implementation, the image processing block 224 is configured to apply the image process to the corresponding pixel data in response to the process select bit being "0". The image processing block 224 is further configured not to apply the image process in response to the process select bit being "1". This results in the image process only being applied to the pixel data for the base image, and not being applied to pixel data for the icons. Not applying the image process to the pixel data for the icons may prevent the icons from being blurred by the image process. The image processing block 224 is further configured to provide the resultant pixel data, which may be processed image data generated by the image process or the original pixel data received from the LVDS interface 210, to the gamma transformation block 226.

The gamma transformation block 226 is configured to apply a gamma transformation to the resultant pixel data received from the image processing block 224 to generate gamma-transformed pixel data. The gamma setting used for the gamma transformation is selected based on the value of the process select bit, as shown in FIG. 6. In the shown embodiment, the display driver 200 is configured to apply a gamma transformation to the pixel data with "gamma setting A" in response to the process select bit being "0" and with "gamma setting "B" in response to the process select bit being "1". As a result, the gamma transformation with "gamma setting B", which is determined suitable for the icons, is applied to the pixel data for the icons to improve the visibility of the icons, while the gamma transformation with "gamma setting A" is applied to the pixel data for the display image other than the icons.

The driver circuit 230 is configured to drive the display panel 300 based on the gamma-transformed pixel data received from the gamma transformation block 226. In one implementation, the gamma-transformed pixel data may include gamma-transformed graylevels for red, green, and blue for each pixel, and the driver circuit 230 may be configured to drive each pixel of the display panel 300 in accordance with the gamma-transformed graylevels for red, green, and blue.

Figure 10:
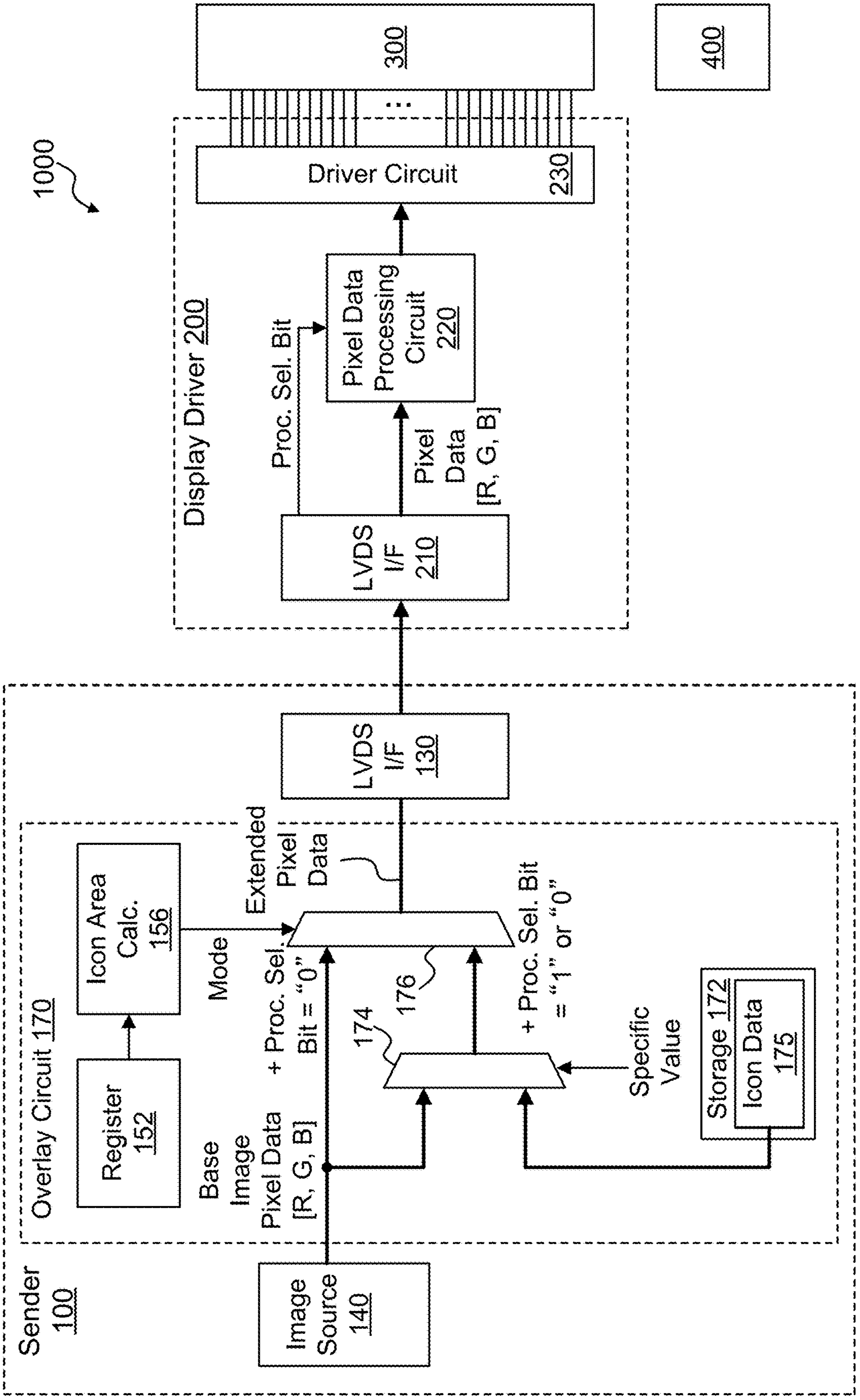
FIG. 10 shows an example configuration of an overlay circuit, according to one or more embodiments.
Figure 11:
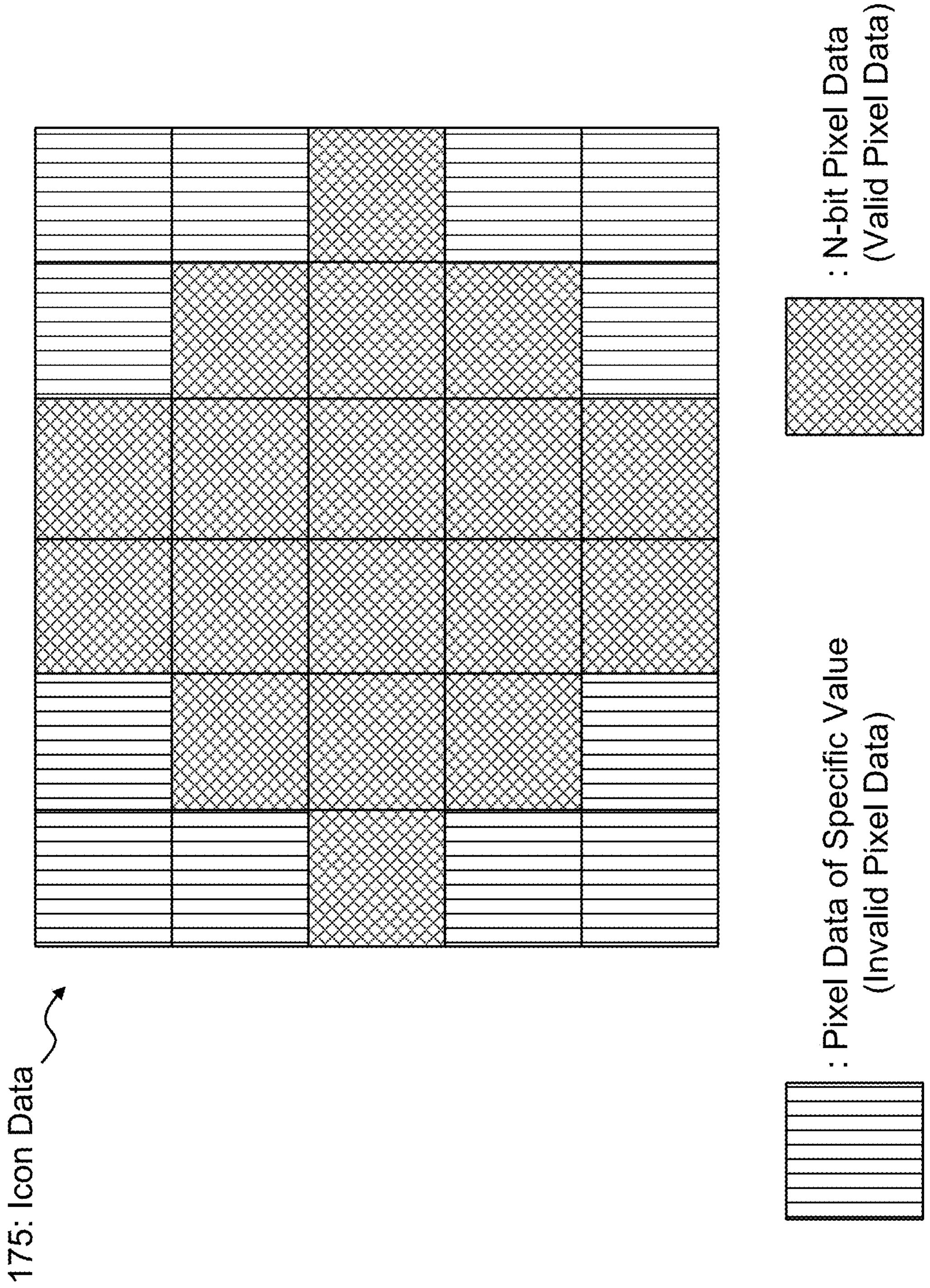
FIG. 11 shows another example format of icon data of an icon, according to one or more embodiments.

FIG. 10 shows another example configuration of the overlay circuit, denoted by numeral 170, according to other embodiments. In the shown embodiment, the overlay circuit 170 is configured similarly to the overlay circuit 150 shown in FIG. 7 except that the overlay circuit 170 includes a storage 172, a first selector 174, and a second selector 176 instead of the storage 154, the first selector 158, and the second selector 160. The storage 172 is configured to store icon data 175 of each icon to be overlaid on the base image. FIG. 11 shows an example format of icon data 175 of an icon, according to one or more embodiments. In the shown embodiment, the icon data 175 includes pixel data of pixels of a rectangular region that circumscribes the icon. It should be noted that the icon may have a shape other than rectangular. The icon data 175 includes N-bit pixel data for each pixel of the icon and pixel data of a predetermined "specific" value for each pixel that is within the rectangular region but is not part of the icon. The "specific" value of pixel data indicates that the pixel data is invalid pixel data that should not be incorporated in the extended pixel data, while other values of pixel data indicate that the pixel data is valid pixel data.

Referring back to FIG. 10, the first selector 174 and the second selector 176 are collectively configured to partially replace the base image pixel data with the pixel data of the icon data 175 based on the mode signal received from the icon area calculation circuit 156 and whether or not the value of the pixel data of the icon data 175 is the "specific" value. When base image pixel data for a pixel of interest is provided to the overlay circuit 170, the first selector 174 receives corresponding pixel data of the icon data 175 and selects the base image pixel data or the corresponding pixel data of the icon data 175 based on whether or not the corresponding pixel data has the "specific" value. More specifically, the first selector 174 selects the base image pixel data when the value of the pixel data of the icon data 175 is the "specific" value, and selects the corresponding pixel data of the icon data 175 when the value of the pixel data of the icon data 175 is not the "specific" value. The first selector 174 is configured to provide the selected pixel data to the second selector 176, and further to provide a process select bit for the selected pixel data. The value of the process select bit is set to "0" by the first selector 174 when the first selector 174 selects the base image pixel data, and is set to "1" when the first selector 174 selects the pixel data of the icon data 175.

The second selector 176 is configured to select the base image pixel data or the pixel data received from the first selector 174 (which may be the pixel data of the icon data 175), based on the mode signal, which indicates whether the pixel data for the pixel of interest corresponds to a pixel of an icon. The second selector 176 is further configured to determine the value of the process select bit of the extended pixel data for the pixel of interest, and to generate the extended pixel data by appending the process select bit to the selected pixel data. In the shown implementation, the second selector 176 is configured to determine the process select bit to be "0" when selecting the base image pixel data, and to determine the process select bit to be equal to the process select bit received from the first selector 174 when selecting the pixel data received from the first selector 174. As a result, the process select bit is set to "1" when the pixel of interest is one of pixels of an icon, and otherwise the process select bit is set to "0". The extended pixel data thus generated is transmitted to the LVDS interface 130 and then to the LVDS interface 210 of the display driver 200.

To ensure the data transfer reliability of pixel data for icons, the expected value of a cyclic redundancy check (CRC) code for pixel data of each icon may be calculated and stored in a storage of the display driver 200, and the display driver 200 may be configured to detect, when receiving extended pixel data for an icon, a data error of the pixel data contained in the extended pixel data for that icon by comparing the CRC code calculated from the pixel data of the extended pixel data with the expected value stored in the display driver 200. The expected value for pixel data of each icon may be provided to the display driver 200 during normal use or during the manufacturing or testing process. In one implementation, the icon data may include valid pixel data and invalid pixel data as shown in FIGS. 8 and 11, and the CRC code for the icon may be calculated by summing up CRC values of the valid pixel data of the respective pixels of the icon. It should be noted that the expected value of the CRC code does not change even when the base image and/or the location of the icon is changed. Since the locations of the pixels of the icon are identifiable using the pixel addresses and the values of the process select bits, the display driver 200 is able to calculate the CRC code of the pixel data for each icon from the extended pixel data and detect a data error of the pixel data for each icon by comparing the calculated CRC code with the expected value stored in the display driver 200.

In alternative embodiments, one or more error correction codes for pixel data of each icon may be calculated and stored in a storage of the display driver 200, and the display driver 200 may be configured to, when receiving extended pixel data for an icon, perform error correction on the pixel data contained in the extended pixel data for that icon based on the one or more error correction codes stored in the display driver 200. The one or more error correction codes for pixel data of each icon may be calculated and provided to the display driver 200 during normal use or during the manufacturing or testing process. Since the locations of the pixels of the icon are identifiable using the pixel address and the value of the process select bit, the display driver 200 is able to perform the error correction even when the base image and/or the location of the icon is changed.

In some embodiments, the format of extended pixel data for pixels of icons may be different from the format of extended pixel data for pixels of the base image (i.e., the display image other than the icons). In one implementation, the number of bits of pixel data contained in the extended pixel data for the pixels of the icons is less than the number of bits of pixel data contained in the extended pixel data for other pixels, while the extended pixel data for the pixels of the icons further includes an error correction code used for error correction/detection of the pixel data. In such embodiments, the display driver 200 may be configured to perform error correction/detection of the pixel data using the error correction code. It is noted that the number of bits of pixel data for icons may be allowed to be reduced, because vivid colors are generally used for icons. Meanwhile, in some applications such as automotive applications, it may be desirable to avoid a data error in the pixel data of icons, since icons may be used to present important information (e.g., safety-related information) to the user. Providing pixel data with an error correction code effectively improves the data transfer reliability of the pixel data. In other embodiments, the extended pixel data for the pixels of the icons may include an error detection code (e.g., a cyclic redundancy check (CRC) code) used for error detection of the pixel data, and the display driver 200 may be configured to perform error detection of the pixel data using the error correction code. In one implementation, the display driver 200 may be configured to notify the sender 100 (e.g., the host 110 of the sender 100 shown in FIGS. 2 and 3) of the occurrence of the data error in the pixel data.

Figure 12:
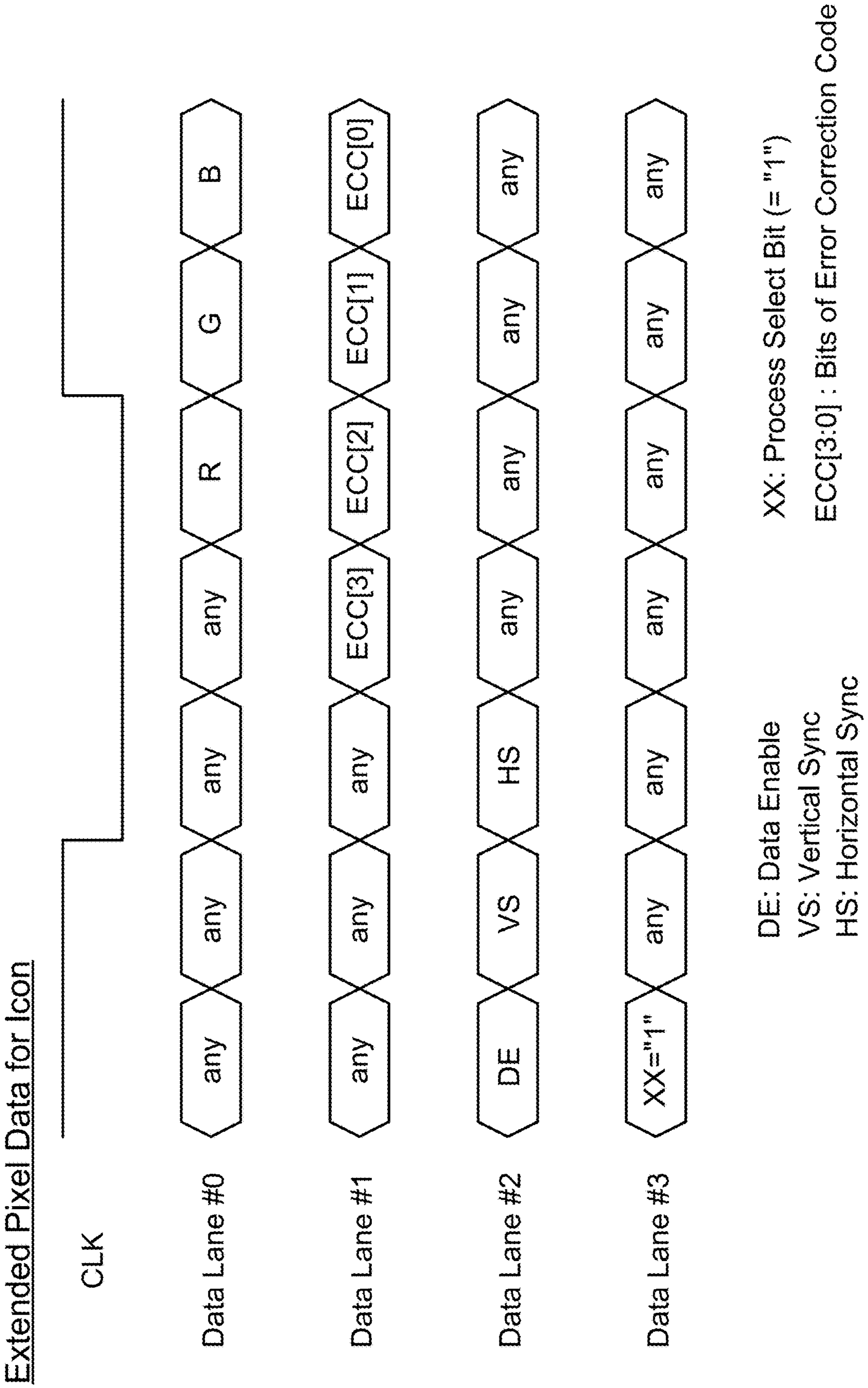
FIG. 12 shows an example format of extended pixel data for each pixel of icons, according to one or more embodiments.

FIG. 12 shows an example format of the extended pixel data for each pixel of icons, according to one or more embodiments. It should be noted that the format of extended pixel data for pixels of the display image other than the icons may be as shown in FIG. 4A or 4B. In the embodiment shown in FIG. 12, the process select bit of the extended pixel data for each pixel of the icons is "1". Further, the extended pixel data for each pixel of the icons includes 3-bit pixel data that contains one red graylevel bit denoted by "R" in FIG. 12, one green graylevel bit denoted by "G", and one blue graylevel bit denoted by "B". In other embodiments, the extended pixel data for each pixel of icons may include pixel data that contains two or more red graylevel bits, two or more green graylevel bits, and two or more blue graylevel bits. The extended pixel data for each pixel of the icons may further include an error correction code ECC[3:0] for error correction/detection of the pixel data. In the shown embodiment, the error correction code ECC[3:0] includes four code bits ECC[3], ECC[2], ECC[1], and ECC[0]. In other embodiments, the number of code bits of the error correction code may be different from four as long as the error correction/detection of the pixel data is possible. Further, the mapping of the pixel data (or the graylevel bits "R", "G", and "B") and the error correction code bits ECC[3], ECC[2], ECC[1], and ECC[0] to the data lanes may be modified from that shown in FIG. 12 as long as the mapping of the vertical synchronization bit VS, the horizontal synchronization bit HS, the data enable bit DE, and the process select bit "XX" are kept unchanged.

FIG. 13 is a table showing an example correlation between values of the process select bit of extended pixel data and corresponding processes applied to the pixel data contained in the extended pixel data in implementations where the extended pixel data for each pixel of the icons includes an error correction code, according to one or more embodiments. In the shown embodiment, the value of the process select bits of the extended pixel data for the icons is "1" while the value of the process select bits of the extended pixel data for other pixels is "0". In the embodiment shown in FIG. 13, the display driver 200 is configured to perform, in response to the process select bit being "1", error correction and/or detection on the pixel data contained in the extended pixel data using the error correction code contained in the extended pixel data. When the process select bit is "0", the display driver 200 does not perform error correction and/or detection on the pixel data contained in the extended pixel data, because the extended pixel data does not contain the error correction code.

Similarly to the embodiment shown in FIG. 6, the display driver 200 may further be configured to, refer to the process select bits of the extended pixel data of the respective pixels in the display image to select, based on the process select bits, processes to be applied to the pixel data of the extended pixel data. The display driver 200 may be configured to apply a gamma transformation to the pixel data with "gamma setting A" in response to the process select bit being "0" and with "gamma setting B" in response to the process select bit being "1". As a result, the gamma transformation with "gamma setting A" is applied to the pixel data for the display image other than the one or more icons and the gamma transformation with "gamma setting B" is applied to the pixel data for the one or more icons. The display driver 200 may be further configured to apply an image process (e.g., color adjustment, contrast correction, brightness correction, and other image processes) to the pixel data in response to the process select bit being "0", and not to apply the image process in response to the process select bit being "1". As a result, the image process is applied to the pixel data for the base image and is not applied to pixel data for the one or more icons.

Figure 14:
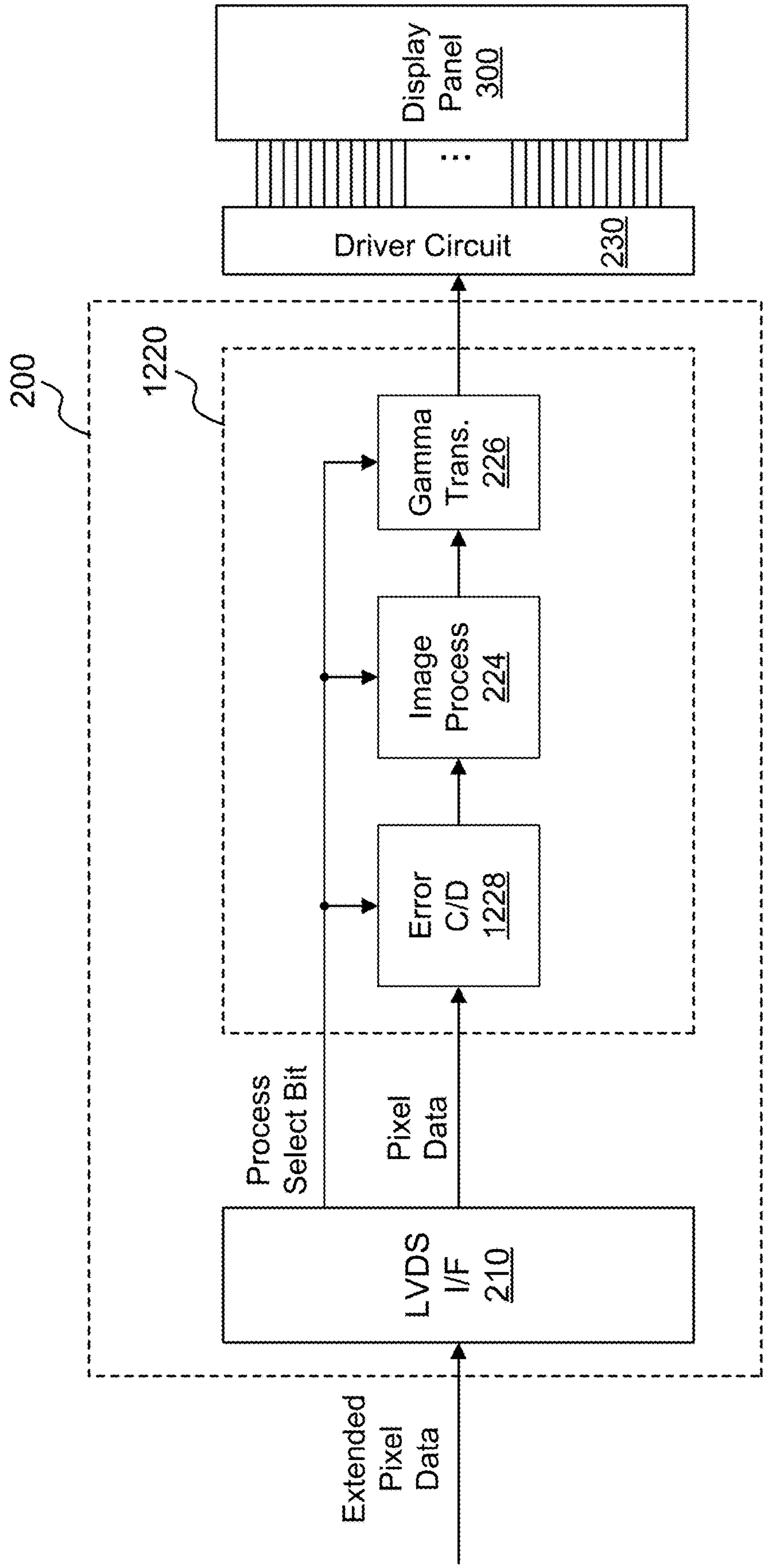
FIG. 14 shows an example configuration of a pixel data processing circuit, according to one or more embodiments.

FIG. 14 shows an example configuration of a pixel data processing circuit 1220 adapted to the error correction/detection described in relation to FIGS. 12 and 13, according to one or more embodiments. In the shown embodiment, the pixel data processing circuit 1220 is configured similarly to the pixel data processing circuit 220 shown in FIG. 9 except that the pixel data processing circuit 1220 includes an error correction/detection block 1228 in addition to the image processing block 224 and the gamma transformation block 226. The extended pixel data, which includes pixel data and a corresponding process select bit for each pixel is provided to the error correction/detection block 1228. The error correction/detection block 1228 is configured not to perform error correction and/or detection on the pixel data in response to the process select bit being "0". The error correction/detection block 1228 is configured to, in response to the process select bit being "1", perform error correction and/or detection on the pixel data contained in the extended pixel data using the error correction code contained in the extended pixel data. In one implementation, the error correction/detection block 1228 may be configured to, when the error correction/detection block 1228 does not detect an error in the pixel data, forward the pixel data to the image processing block 224. The error correction/detection block 1228 may further be configured to, when the error correction/detection block 1228 detects an error in the pixel data, notify the sender 100 (e.g., the host 110 of the sender 100 shown in FIGS. 2 and 3) of the occurrence of the data error in the pixel data. Additionally or alternatively, the error correction/detection block 1228 may be configured to, upon detecting a correctable error in the pixel data, correct the error and provide the error-corrected pixel data to the image processing block 224. The error correction/detection block 1228 may further be configured to, upon detecting an uncorrectable error in the pixel data, notify the sender 100 of the occurrence of the uncorrectable error in the pixel data.

Figure 15:
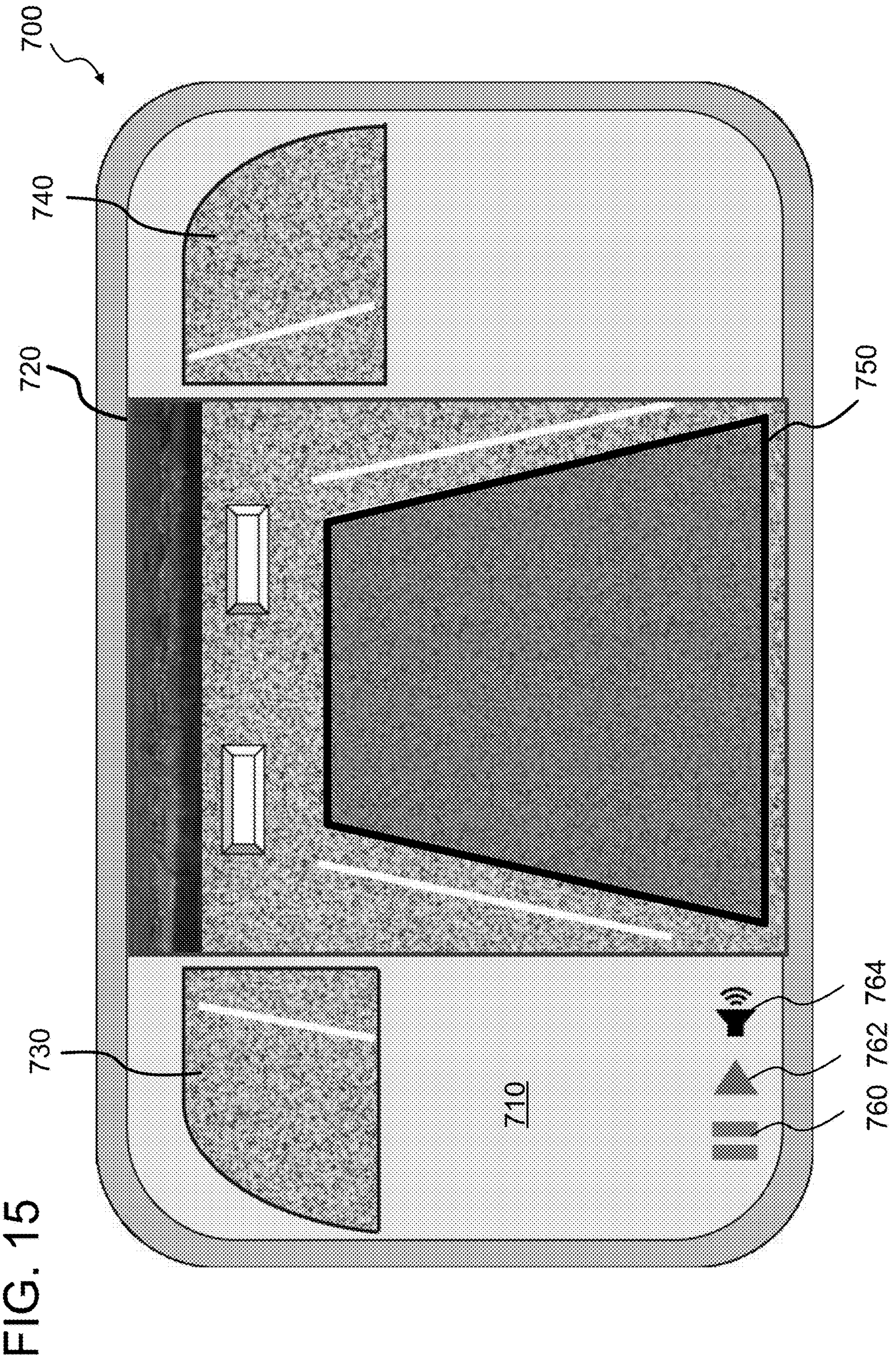
FIG. 15 shows an example display image rendered for automotive instrument panel applications, according to one or more embodiments.

FIG. 15 shows another example display image 700 rendered by the sender 100 for automotive instrument panel applications, according to one or more embodiments. The display image 700 is rendered by overlaying various image elements on a base image 710. In the shown embodiment, the display image 700 is rendered by overlaying a back monitor image 720, a pair of side monitor images 730 and 740, a guide scale 750, and icons 760, 762, and 764 on the base image 710. The back monitor image 720 may be captured by a back monitor camera (or a rear camera) of an automotive vehicle, and the side monitor images 730 and 740 may be captured by side monitor cameras (or side cameras) of the automotive vehicle. The guide scale 750 indicates an expected future location of the automotive vehicle in the back monitor image 720 while the automotive vehicle is being backed. The icons 760, 762, and 764 may be used to inform the user (or driver) of information related to the status of the automotive vehicle.

Figure 16:
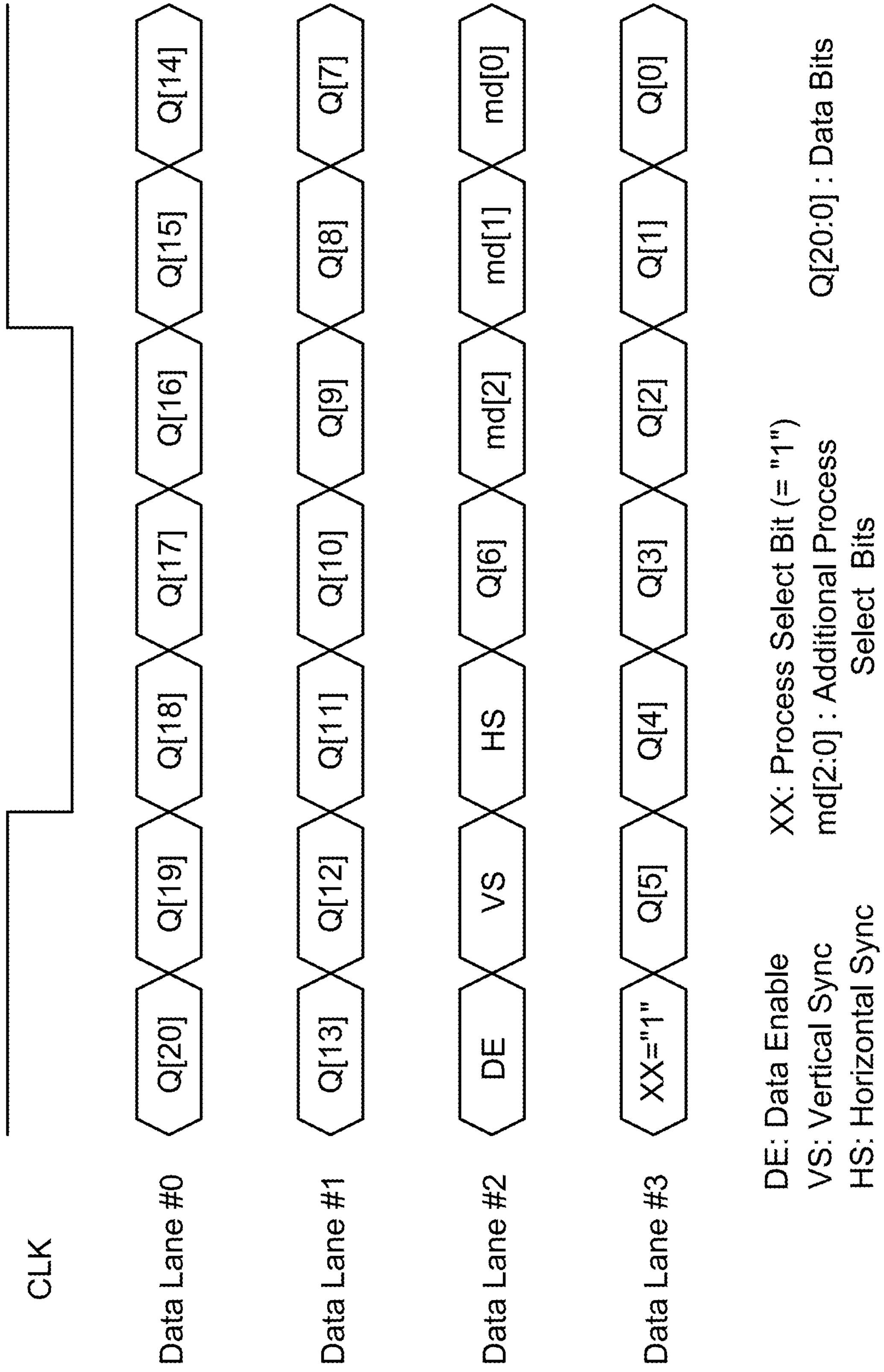
FIG. 16 shows an example format of extended pixel data, according to one or more embodiments.

FIG. 16 is an example format of extended pixel data for each pixel of the image elements overlaid on the base image 710, according to one or more embodiments. It is noted that the format of the extended pixel data for the pixels of the base image 710 (i.e., the pixels of the display image 700 other than the image elements) may be as shown in FIG. 4A or 4B. In the shown embodiment, the extended pixel data for the overlaid image elements may include data bits Q[0] to Q[20] (which may also be referred to as Q[20:0]), a process select bit "XX", and additional process select bits md[2] to md[0]. At least some of which the data bits Q[0] to Q[20] are used as pixel data. Further, at least some of the remaining bits of the data bits may be used as error correction code bits. The process select bit "XX" and the additional process select bits md[2] to md[0] are used to select processes to be applied to the pixel data. The values of the process select bit "XX" and the additional process select bits md[2] to md[0] are determined depending the type of the image element (e.g., the back monitor image, the side monitor images, the guide scale, or the icon). While FIG. 16 shows that the number of the additional process select bits is three, the number of the additional process select bits may be different from three. Similarly, while FIG. 16 shows that the number of the data bits is 21, the number of the data bits may be different from 21. Further, the mapping of the data bits Q[0] to Q[20] and the additional process select bits md[2] to md[0] to the data lanes may be modified from that shown in FIG. 16 as long as the mapping of the vertical synchronization bit VS, the horizontal synchronization bit HS, the data enable bit DE, and the process select bit "XX" are kept unchanged.

Additionally, a data enable bit DE, a vertical synchronization bit VS, and a horizontal synchronization bit HS may be transmitted during each clock cycle as required by the JEIDA format and the VESA format. The data enable bit DE may be set to "1" during clock cycles during which pixel data are being transmitted to the display driver as required by the JEIDA format and the VESA format, because the "1" value of the data enable bit DE informs the display driver that the pixel data are currently being transmitted. Further, as recommended by the JEIDA format and the VESA format, the vertical synchronization bit VS and the horizontal synchronization bit HS may be fixed to "1" during the clock cycles during which the pixel data are being transmitted, although the operation of the display driver is not dependent on the values of the vertical synchronization bit VS and the horizontal synchronization bit HS as long as the data enable bit DE is fixed to "1".

FIG. 17 is a table showing an example correlation between values of the process select bit and additional process select bits of extended pixel data and corresponding processes to be applied to the pixel data contained in the extended pixel data, according to one or more embodiments. Processes to be applied to the pixel data of the extended pixel data are determined or selected based on the process select bits and the additional process select bits.

In one implementation, the value of the process select bits of the pixels of the base image (or the display image other than the overlaid image elements) may be "0", and the processes applied to the pixel data of the pixels of the base image may be selected in response to the process select bits being "0". It is noted that the extended pixel data for the pixels of the base image does not include additional process select bits. In the shown embodiment, the processes applied to the pixel data of the pixels of the base image include a gamma transformation with gamma setting "A", image processes #1, #2, and #3. Examples of image processes #1, #2, and #3 include, but are not limited to, color adjustment, contrast correction, and brightness correction. Other image processes may be additionally applied to the pixel data of the pixels of the base image in response to the process select bits being "0".

In one implementation, the value of the process select bits for the pixels of the image elements overlaid on the base image may be "1". Further, the values of the additional process select bits md[2:0] may be determined dependent on the types of the image elements, and the processes applied to the pixel data of the pixels of the image elements may be selected in response to the additional process select bits md [2:0]. In the shown embodiment, the value of the process select bits md[2:0] of the extended pixel data for pixels of icons of type #1 is "000", and the processes applied to the pixel data of the pixels of the icons of type #1 are selected in response to the additional process select bits md[2:0] being "000". In the shown embodiment, the processes applied to the pixel data of the pixels of the pixels of icons of type #1 include a gamma transformation with gamma setting "B" and an error correction/detection. Other image processes may be additionally applied to the pixel data of the pixels of the icons of type #1 in response to the additional process select bits md[2:0] being "000". Similarly, the value of the process select bits md[2:0] of the extended pixel data for pixels of icons of type #2 is "001", and the processes applied to the pixel data of the pixels of the icons of type #2 are selected in response to the additional process select bits md[2:0] being "001". In the shown embodiment, the processes applied to the pixel data of the pixels of the pixels of icons of type #2 include a gamma transformation with gamma setting "C" and an error correction/detection. Other image processes may be additionally applied to the pixel data of the pixels of the icons of type #2 in response to the additional process select bits md[2:0] being "001".

Figure 18A:
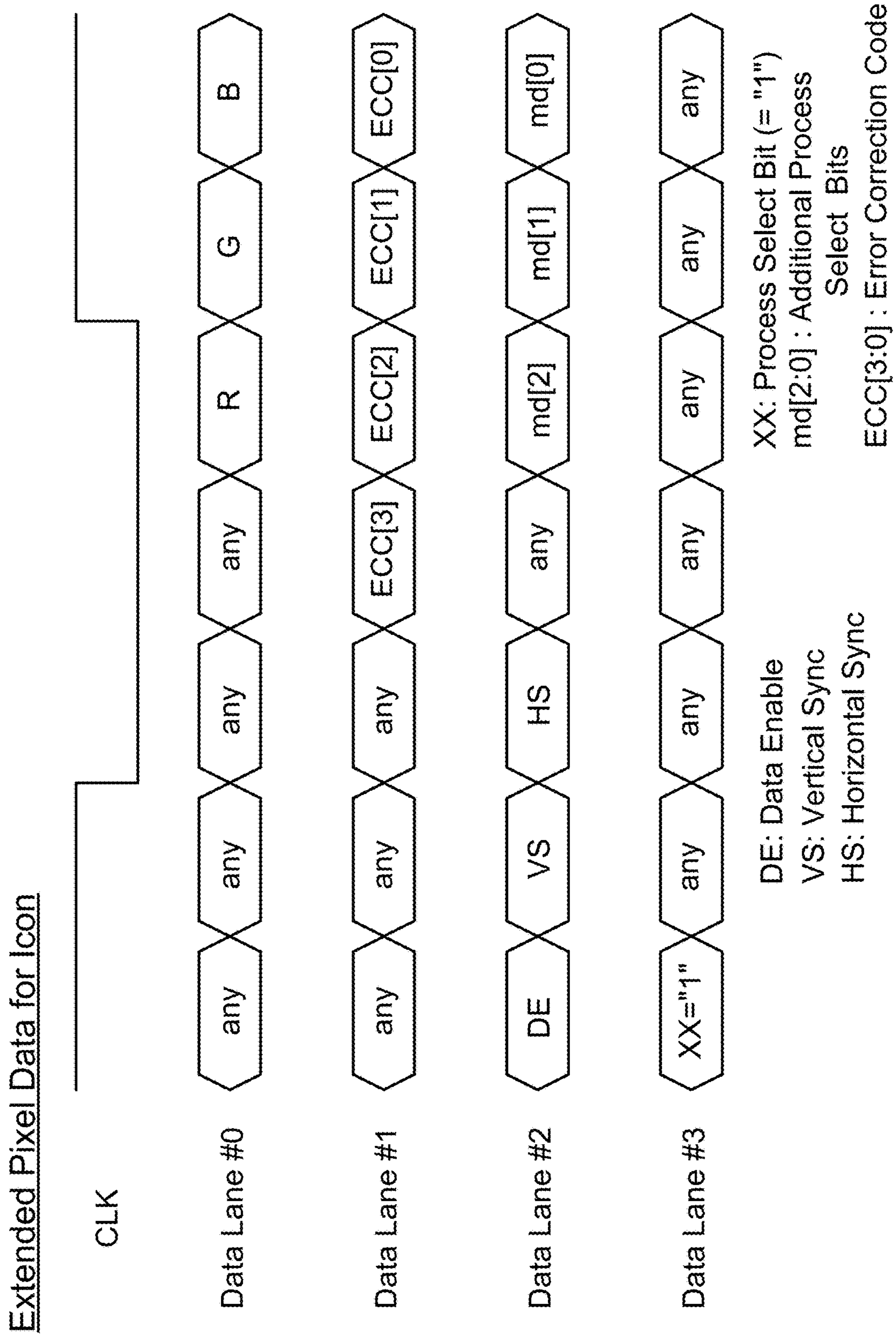
FIG. 18A shows an example format of extended pixel data for icons, according to one or more embodiments.

FIG. 18A shows an example format of the extended pixel data for the icons of types #1 and #2, according to one or more embodiments. As discussed above, the extended pixel data for each pixel of the icons of types #1 and #2 includes a process select bit, denoted by "XX" in FIG. 18A, and additional process select bits md[2:0]. The extended pixel data for each pixel of the icons further includes 3-bit pixel data that contains one red graylevel bit denoted by "R", one green graylevel bit denoted by "G", and one blue graylevel bit denoted by "B". In other embodiments, the extended pixel data for each pixel of icons may include pixel data that contains two or more red graylevel bits, two or more green graylevel bits, and two or more blue graylevel bits. The extended pixel data for each pixel of the icons types #1 and #2 further includes an error correction code ECC[3:0] for error correction/detection of the pixel data. In the shown embodiment, the error correction code ECC[3:0] includes four code bits ECC[3], ECC[2], ECC[1], and ECC[0]. In other embodiments, the number of code bits of the error correction code may be different from four as long as the error correction/detection of the pixel data is possible. Further, the mapping of the pixel data (or the graylevel bits "R", "G", and "B"), the error correction code ECC[3:0], and the additional process select bits md[2:0] to the data lanes may be modified from that shown in FIG. 18A as long as the mapping of the vertical synchronization bit VS, the horizontal synchronization bit HS, the data enable bit DE, and the process select bit "XX" are kept unchanged.

Referring back to FIG. 17, processes applied to the pixel data of other types of the image elements are selected in a similar manner. In the shown embodiment, the value of the process select bits md[2:0] of the extended pixel data for pixels of the guide scale is "010", and the processes applied to the pixel data of the pixels of the guide scale are selected in response to the additional process select bits md[2:0] being "010". In the shown embodiment, the processes applied to the pixel data of the pixels of the guide scale include a gamma transformation with gamma setting "D". Other image processes may be additionally applied to the pixel data of the pixels of the guide scale in response to the additional process select bits md[2:0] being "010". Similarly, the value of the process select bits md[2:0] of the extended pixel data for pixels of the back monitor image is "100", and the processes applied to the pixel data of the pixels of the back monitor image are selected in response to the additional process select bits md[2:0] being "100". In the shown embodiment, the processes applied to the pixel data of the pixels of the back monitor image include a gamma transformation with gamma setting "E", image processes #1 and #3. Other image processes may be additionally applied to the pixel data of the pixels of the back monitor image in response to the additional process select bits md[2:0] being "100". Further, the value of the process select bits md[2:0] of the extended pixel data for pixels of the side monitor images is "101", and the processes applied to the pixel data of the pixels of the side monitor image are selected in response to the additional process select bits md[2:0] being "101". In the shown embodiment, the processes applied to the pixel data of the pixels of the side monitor images include a gamma transformation with gamma setting "F", image processes #1 and #3. Other image processes may be additionally applied to the pixel data of the pixels of the side monitor image in response to the additional process select bits md[2:0] being "101".

Figure 18B:
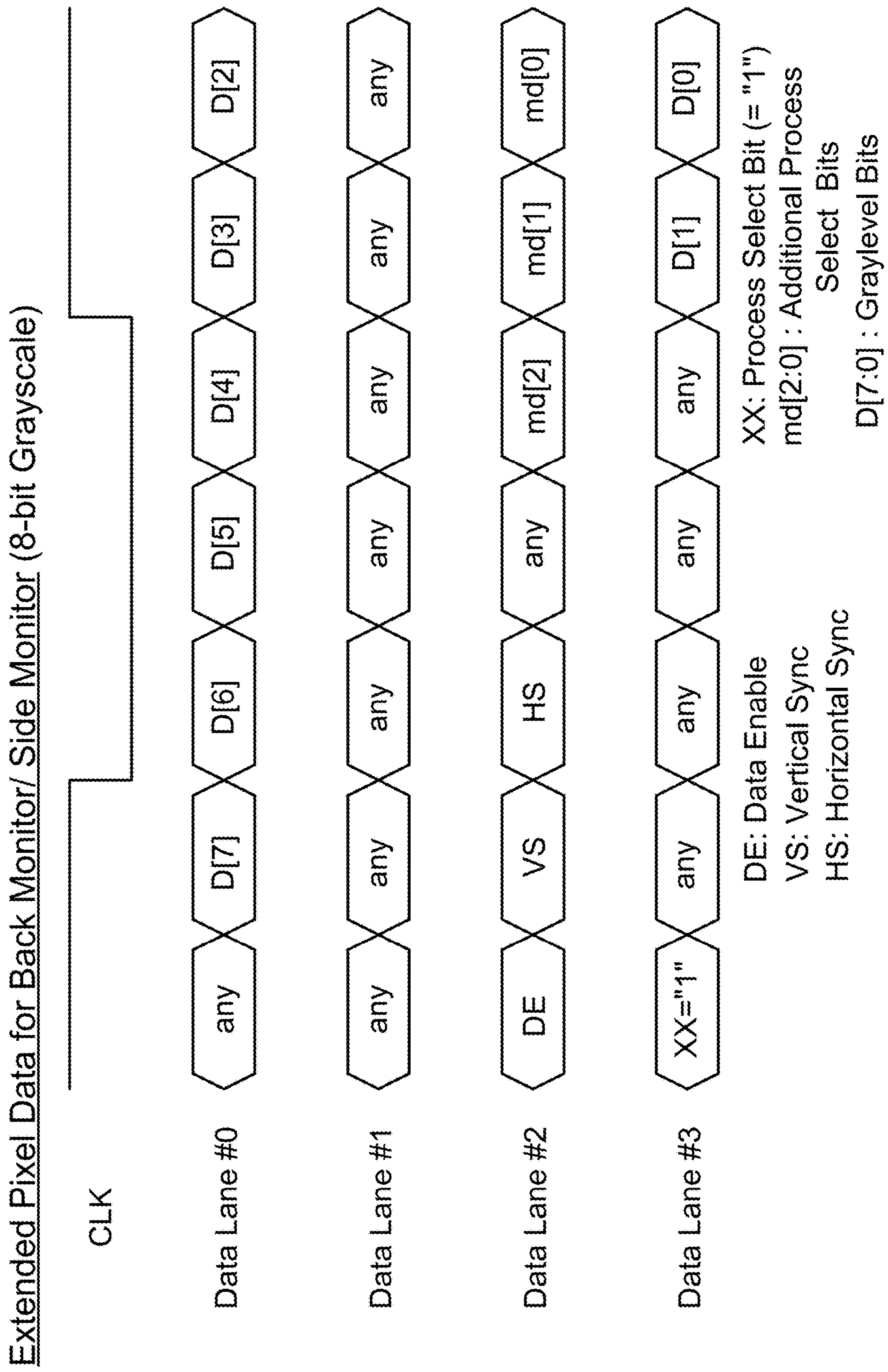
FIG. 18B shows an example format of extended pixel data for a back monitor image and side monitor images, according to one or more embodiments.

FIG. 18B shows an example format of the extended pixel data for the back monitor image and the side monitor images, according to one or more embodiments. As discussed above, the extended pixel data for each pixel of the back monitor image and the side monitor images include a process select bit "XX" and additional process select bits md[2:0]. The extended pixel data for each pixel of the icons further includes grayscale pixel data that contains eight graylevel bits denoted by D[0] to D[7]. In other embodiments, the number of bits of the grayscale pixel data may be different from eight. Further, the mapping of the graylevel bits D[0] to D[7] and the additional process select bits md[2:0] to the data lanes may be modified from that shown in FIG. 18B as long as the mapping of the vertical synchronization bit VS, the horizontal synchronization bit HS, the data enable bit DE, and the process select bit "XX" are kept unchanged.

Hereinafter, image process #1, image process #2, and image process #3, which are listed in the table shown in FIG. 17, may also be referred to as FC #1, FC #2, and FC #3, respectively. In addition, other image processes applied to pixel data may be referred to as FC #i.

Figure 19:
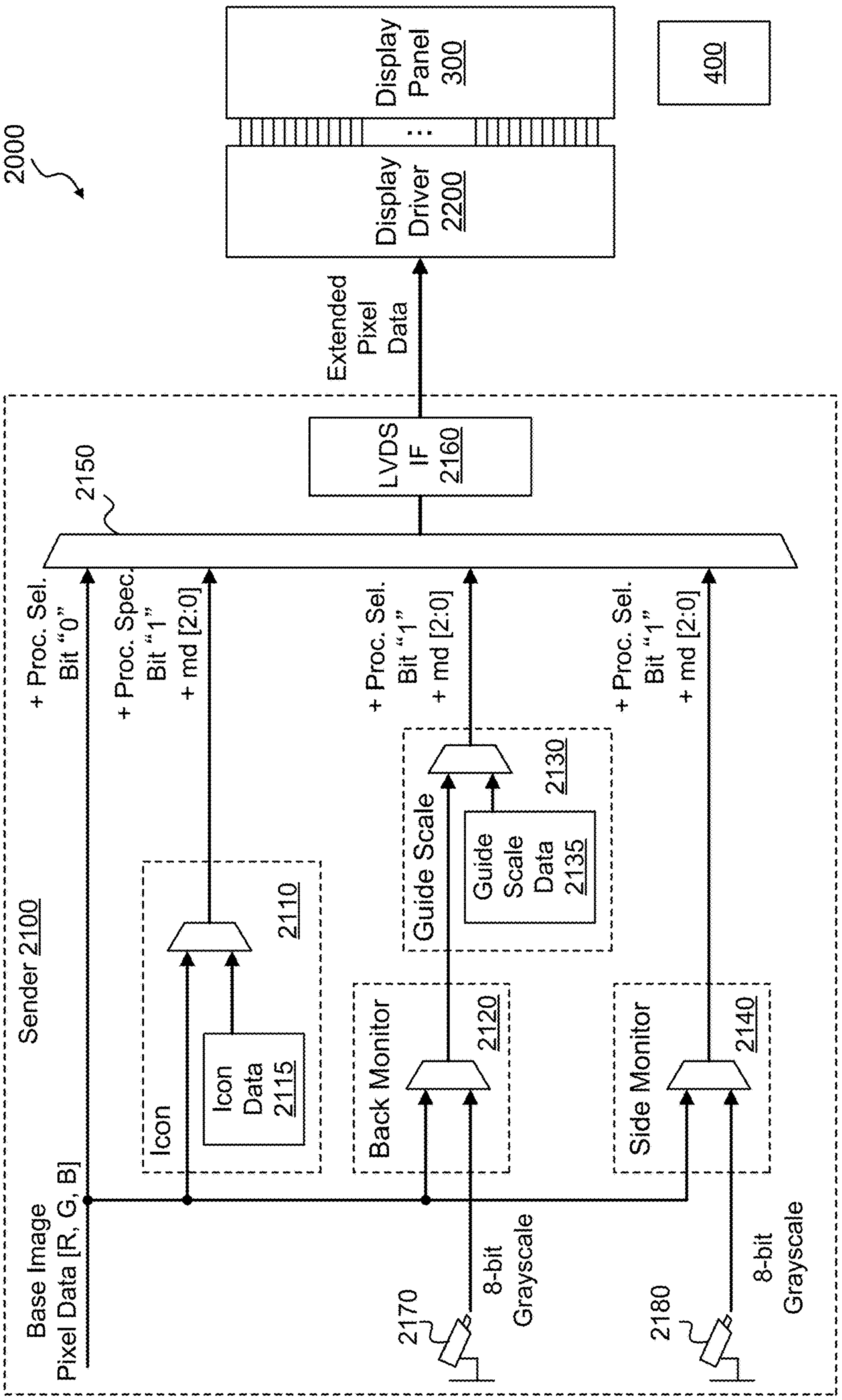
FIG. 19 shows an example configuration of a display system, according to one or more embodiments.

FIG. 19 shows an example configuration of a display system 2000 in implementations where the processes applied to the pixel data are selected as shown in FIG. 17, according to one or more embodiments. In the shown embodiment, the display system 2000 includes a sender 2100 and a display driver 2200 configured to drive the display panel 300.

The sender 2100 is configured to render the display image by overlaying the icons, the back monitor image, the side monitor images, and the guide scale on the base image, and to generate extended pixel data for the display image. As described in relation to FIG. 17, the extended pixel data for the base image includes pixel data and a process select bit for each pixel, not including additional process select bits, while the extended pixel data for the icons, the back monitor image, the side monitor images, and the guide scale includes pixel data and a process select bit, and additional process bits for each pixel.

The display driver 2200 is configured to receive the extended pixel data and determine, based on the process select bit, whether the extended pixel data includes the one or more additional process select bits. In the embodiment shown in FIG. 17, the display driver 2200 is configured to determine, based on the fact that the process select bit is "1", that the extended pixel data includes the one or more additional process select bits, and to apply one or more processes to the pixel data contained in the extended pixel data based on the process select bit and the one or more additional process select bits. The display driver 2200 is further configured to determine, based on the fact that the process select bit is "0", that the extended pixel data does not include additional process select bits, and to apply one or more processes to the pixel data contained in the extended pixel data in response to the process select bit being "0".

In the shown embodiment, the sender 2100 includes an icon processing block 2110, a back monitor image processing block 2120, a guide scale processing block 2130, a side monitor image processing block 2140, a selector 2150, and an LVDS interface 2160. The icon processing block 2110 is configured to store icon data 2115 that includes pixel data of each icon, and to partially replace base image pixel data of the base image with the pixel data of the icon data 2115. The icon processing block 2110 is further configured to generate the process select bit ("1" in the embodiment shown in FIG. 17) and the additional process select bits ("000" or "001" in the embodiment shown in FIG. 17) for each pixel of each icon, and to generate extended pixel data for each pixel of each icon by appending the process select bit and the additional process select bits to the pixel data.

The back monitor image processing block 2120 is configured to receive 8-bit grayscale pixel data of the back monitor image from a back monitor camera 2170, and to partially replace the base image pixel data with the 8-bit grayscale pixel data. The 8-bit grayscale pixel data is in a monochrome grayscale format. The back monitor image processing block 2120 is further configured to generate the process select bit ("1" in the embodiment shown in FIG. 17) and the additional process select bits ("100" in the embodiment shown in FIG. 17) for each pixel of the back monitor image, and generate extended pixel data for the pixels of the back monitor image by appending the process select bit and the additional process select bits to the pixel data for each pixel of the back monitor image.

The guide scale processing block 2130 is configured to store guide scale data 2135 that includes pixel data of the guide scale, and partially to replace the 8-bit grayscale pixel data of the back monitor image with the pixel data of the guide scale data 2135. The guide scale processing block 2130 is further configured to generate the additional process select bits ("010" in the embodiment shown in FIG. 17) for each pixel of the guide scale, and to partially replace the additional process select bits for each pixel of the back monitor image with the additional process select bits for each pixel of the guide scale to generate extended pixel data for each pixel of the back monitor image with the guide scale overlaid thereon.

The side monitor image processing block 2140 is configured to receive 8-bit grayscale pixel data of the side monitor images from side monitor cameras 2180 (one shown), and to partially replace the base image pixel data with the 8-bit grayscale pixel data of the side monitor images. The side monitor image processing block 2140 is further configured to generate the process select bit ("1" in the embodiment shown in FIG. 17) and the additional process select bits ("101" in the embodiment shown in FIG. 17) for each pixel of the side monitor images, and to generate extended pixel data for the pixels of the side monitor images by appending the process select bit and the additional process select bits to the pixel data for each pixel of the side monitor images.

The selector 2150 is configured to select one of the base image pixel data and the extended pixel data received from the icon processing block 2110, the guide scale processing block 2130, and the side monitor image processing block 2140. The selector 2150 is further configured to, when selecting the base image pixel data, generate extended pixel data for the pixels of the base image by appending the process select bit ("0" in the embodiment shown in FIG. 17) to the pixel data for each pixel of the base image, and to provide the generated extended pixel data to the display driver 2200 via the LVDS interface 2160. The selector 2150 is further configured to, when selecting the extended pixel data received from the icon processing block 2110, the guide scale processing block 2130, or the side monitor image processing block 2140, provide the selected extended pixel data to the display driver 2200 via the LVDS interface 2160.

Figure 20:
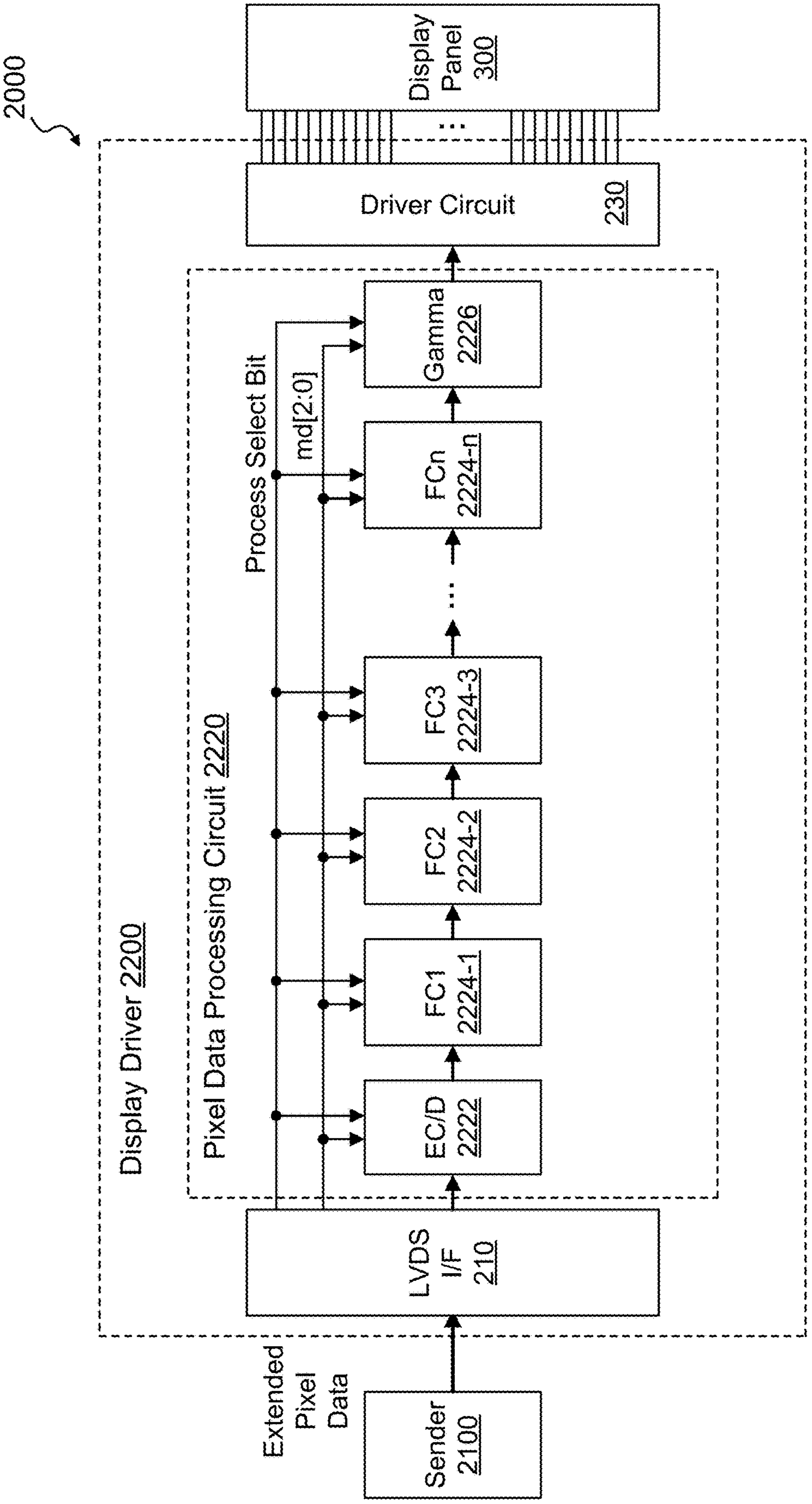
FIG. 20 shows an example configuration of a display driver, according to one or more embodiments.

FIG. 20 shows an example configuration of the display driver 2200, according to one or more embodiments. In the shown embodiment, the display driver 2200 is configured similarly to the display driver 200 shown in FIG. 9 except that the display driver 2200 includes a pixel data processing circuit 2220 instead of the pixel data processing circuit 220. The pixel data processing circuit 2220 is configured to apply processes to the pixel data contained in the extended pixel data based on the process select bit and, if any, the additional process select bits contained in the extended pixel data. In the shown embodiment, the pixel data processing circuit 2220 includes an error correction/detection block 2222, and a set of function (FC) blocks 2224-1 to **2224-*n*, and a gamma transformation block 2226**.

The error correction/detection block 2222 is responsive to the process select bit and the additional process select bits for performing error correction and/or detection on the pixel data. In the embodiment shown in FIG. 17, the error correction/detection block 2222 is configured to perform error correction and/or detection on the pixel data contained in the extended pixel data using the error correction code contained in the extended pixel data when the process select bit is "1" and the additional process select bits are "000" or "001", and not to perform error correction and/or detection otherwise. In one implementation, the error correction/detection block 2222 may be configured to forward the pixel data to the function block 2224-1 when not detecting an error in the pixel data. The error correction/detection block 2222 may be further configured to, when detecting an error in the pixel data, notify the sender 2100 of the occurrence of the data error in the pixel data. Additionally or alternatively, the error correction/detection block 2222 may be configured to, upon detecting a correctable error in the pixel data, correct the error and provide the error-corrected pixel data to the function block 2224-1. The error correction/detection block 2222 may be further configured to, upon detecting an uncorrectable error in the pixel data, inform the sender 2100 of the occurrence of the uncorrectable error in the pixel data.

The function blocks 2224-1 to **2224-*n* are configured to apply image processes #1 to #n, respectively, based on the process select bit and the additional process select bits. For example, in the embodiment shown in FIG. 17, the function block 2224-1 is configured to perform apply image process #1 to the pixel data when the process select bit is "1" and the additional process select bits are "100" or "101". The function block 2224-2 is configured to apply image process #2 to the pixel data when the process select bit is "0". The function block 2224-3 is configured to apply image process #3 when the process select bit is "0" or when the process select bit is "1" and the additional process select bits are "100" or "101". Other function blocks 2224-4 to 2224-*n* are configured to apply image processes #4 to #n, respectively, depending on the values of the process select bit and the additional process select bits. The resultant pixel data generated by the function blocks 2224-1 to 2224-*n* is provided to the gamma transformation block 2226. In alternative embodiments, some of the function blocks 2224-1 to 2224-*n*** may be omitted.

The gamma transformation block 2226 is configured to apply a gamma transformation to the resultant pixel data received from the function block **2224-*n* to generate gamma-transformed pixel data with a gamma setting determined based on the values of the process select bit and the additional process select bits. In the embodiment shown in FIG. 17, the gamma transformation block 2226 is configured to apply a gamma transformation to the pixel data with "gamma setting A" when the process select bit is "0", and with "gamma setting B" when the process select bit is "1" and the additional process select bits are "000". The gamma transformation block 2226 is further configured to apply a gamma transformation to the pixel data with "gamma setting C" when the process select bit is "1" and the additional process select bits are "001", and with "gamma setting D" when the process select bit is "1" and the additional process select bits are "010". The gamma transformation block 2226 is further configured to apply a gamma transformation to the pixel data with "gamma setting E" when the process select bit is "1" and the additional process select bits are "100", and with "gamma setting F" when the process select bit is "1" and the additional process select bits are "101". The driver circuit 230 is configured to drive the display panel 300 based on the gamma-transformed pixel data received from the gamma transformation block 2226. In one implementation, the gamma-transformed pixel data may include gamma-transformed graylevels for red, green, and blue for each pixel, and the driver circuit 230 may be configured to drive each pixel of the display panel 300** in accordance with the gamma-transformed graylevels for red, green, and blue.

Figure 21:
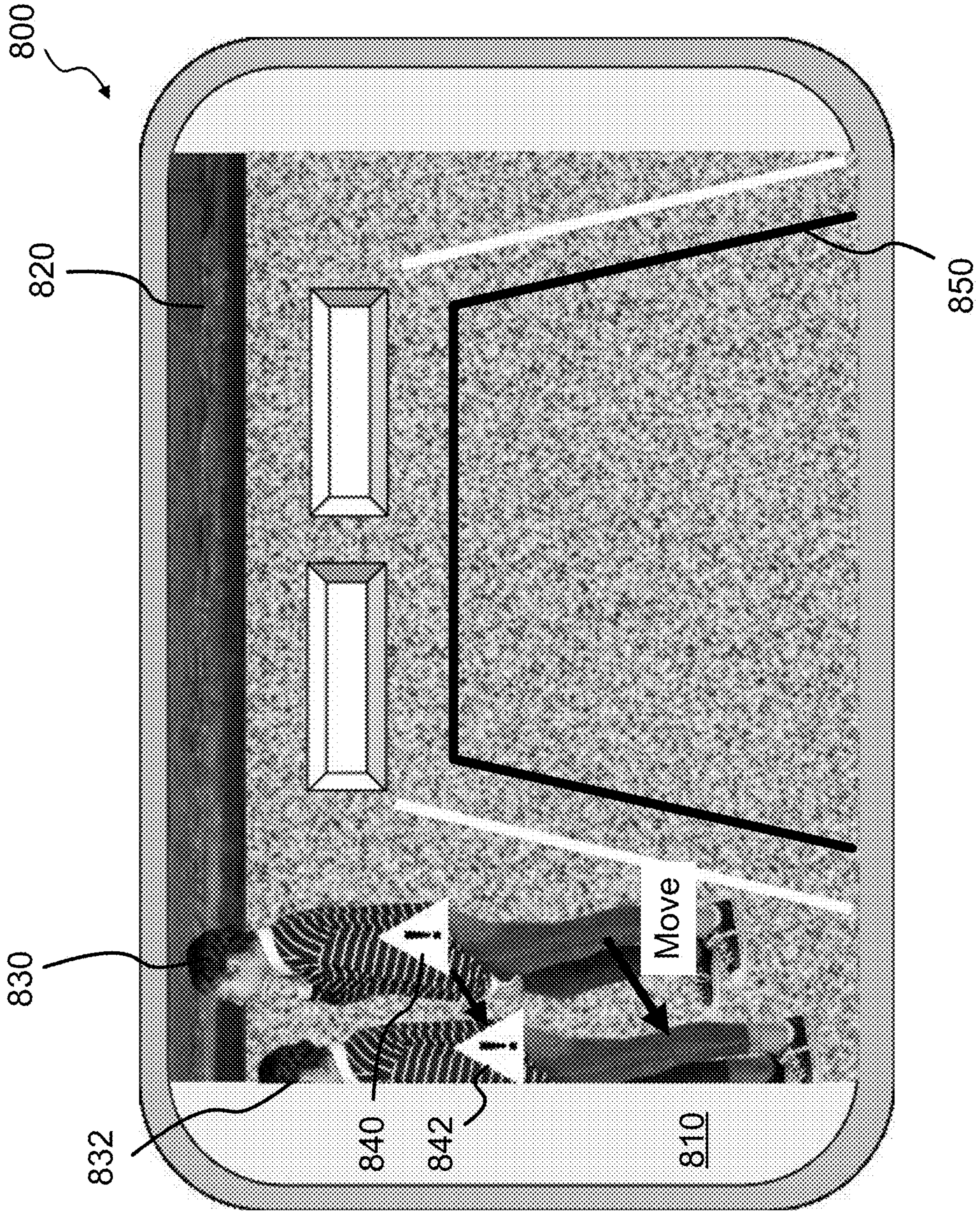
FIG. 21 shows an example display image, according to one or more embodiments.

FIG. 21 shows an example display image 800, according to one or more embodiments. In the shown embodiment, the display image 800 is rendered by overlaying a back monitor image 820 and a guide scale 850 on a base image 810. Further, an obstacle detection may be performed on the back monitor image 820 and, when an obstacle 830 (a human obstacle in the embodiment shown in FIG. 21) is detected in the back monitor image 820, an alert icon 840 is further overlaid on the back monitor image 820 to alert the detection of the obstacle 830. The alert icon 840 may be located to overlap the obstacle 830 or located near the obstacle 830. In some implementations, the movement of the obstacle 830 is tracked and the location of the alert icon 840 is moved in accordance with the movement of the obstacle 830. In FIG. 21, the numerals 832 and 842 denotes the obstacle and the alert icon after the movement. The use of the format of the extended pixel data shown in FIG. 18A, which includes a process select bit and additional process select bits for each pixel of the icon, facilitates the application of image processes to the pixel data of each pixel of an icon while the icon is being moved.

Figure 22:
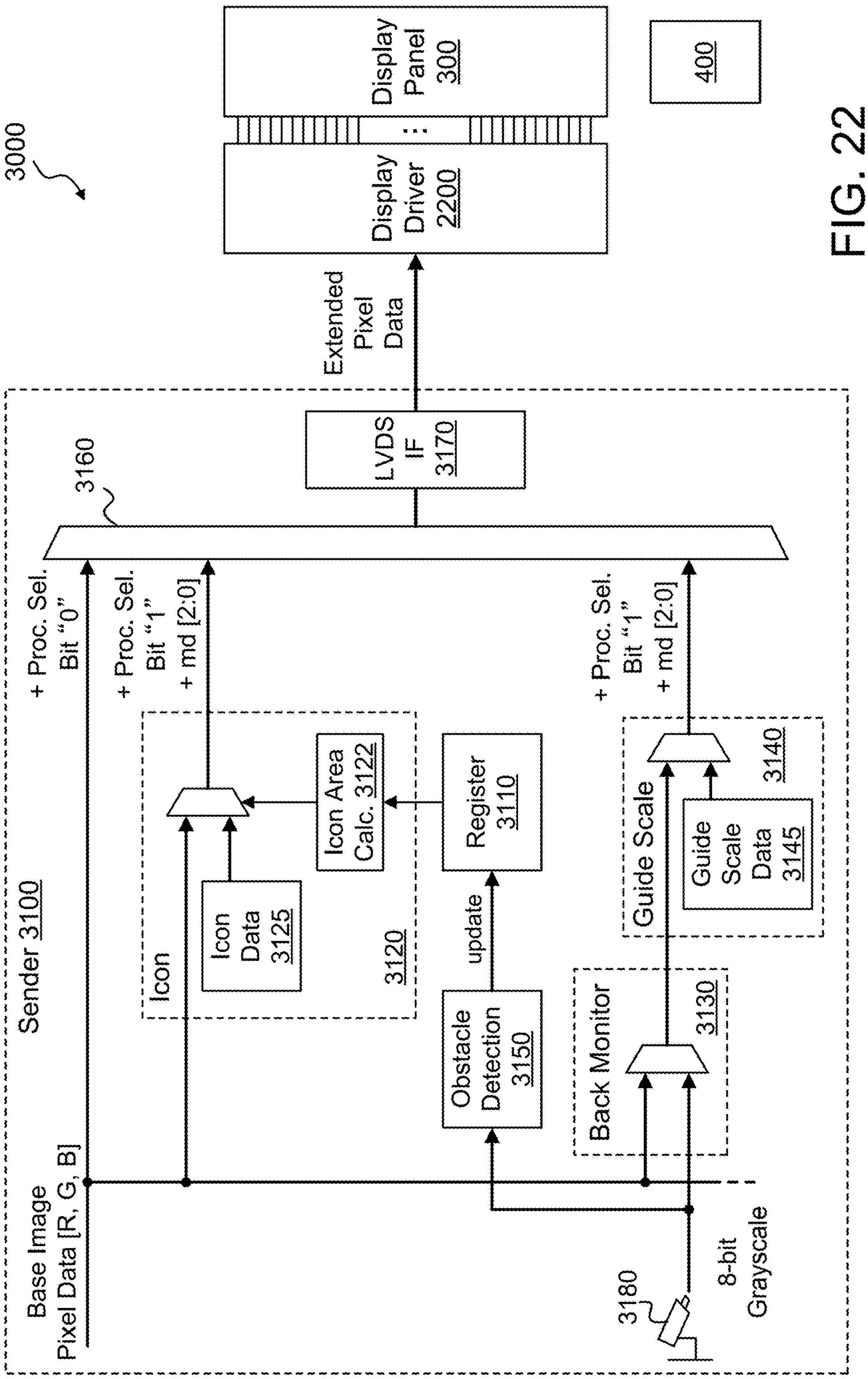
FIG. 22 shows an example partial configuration of a sender, according to one or more embodiments.

FIG. 22 shows an example partial configuration of a sender 3100 configured to render the display image 800 shown in FIG. 21, according to one or more embodiments. The sender 3100 is configured to render the display image by overlaying a back monitor image, one or more icons, and a guide scale on a base image, and to generate extended pixel data for the display image. As described in relation to FIG. 17, the extended pixel data for the base image includes pixel data and a process select bit for each pixel, not including additional process select bits, while the extended pixel data for the icons, the back monitor image, and the guide scale include pixel data, a process select bit, and additional process bits for each pixel. In the shown embodiment, the sender 3100 includes a register 3110, an icon processing block 3120, a back monitor image processing block 3130, a guide scale processing block 3140, an obstacle detection block 3150, a selector 3160, and an LVDS interface 3170.

The register 3110 is configured to store icon definition information indicative of the location of each icon which is to be overlaid on the base image. The icon processing block 3120 is configured to store icon data 3125 that includes pixel data of the icons, and to partially replace base image pixel data of the base image with the pixel data of the icon data 3125 in accordance with the icon definition information. In one implementation, the icon processing block 3120 may include an icon area calculation circuit 3122 configured to determine, based on the icon definition information, whether the base image pixel data that is currently being processed corresponds to a pixel of an icon. The icon processing block 3120 is further configured to, when the base image pixel data that is currently being processed corresponds to a pixel of an icon, replace the base image pixel data with the corresponding pixel data of the icon. The icon processing block 3120 is further configured to generate the process select bit ("1" in the shown embodiment) and the additional process select bits for each pixel of the icon, and to generate extended pixel data for each pixel of the icon by appending the process select bit and the additional process select bits to the pixel data.

The back monitor image processing block 3130 is configured to receive 8-bit grayscale pixel data of the back monitor image from a back monitor camera 3180, and partially replace the base image pixel data with the 8-bit grayscale pixel data. The 8-bit grayscale pixel data is in a monochrome grayscale format. The back monitor image processing block 3130 is further configured to generate the process select bit ("1" in the shown embodiment) and the additional process select bits for each pixel of the back monitor image, and to generate extended pixel data for the pixels of the back monitor image by appending the process select bit and the additional process select bits to the pixel data for each pixel of the back monitor image.

The guide scale processing block 3140 is configured to store guide scale data 3145 that includes pixel data of the guide scale, and to partially replace the 8-bit grayscale pixel data of the back monitor image with the pixel data of the guide scale data 3145. The guide scale processing block 3140 is further configured to generate the additional process select bits for each pixel of the guide scale, and to partially replace the additional process select bits for each pixel of the back monitor image with the additional process select bits for each pixel of the guide scale to generate extended pixel data for each pixel of the back monitor image with the guide scale overlaid thereon.

The obstacle detection block 3150 is configured to perform an obstacle detection on the back monitor image acquired by the back monitor camera 3180, and to update the icon definition data based on the location of the detected obstacle so that an alert icon is displayed to overlap the detected obstacle or is displayed near the detected obstacle. The obstacle detection block 3150 is further configured to track the movement of the detected obstacle and successively update the icon definition data to move the location of the alert icon in accordance with the movement of the detected obstacle.

The selector 3160 is configured to select one of the base image pixel data and the extended pixel data received from the icon processing block 3120, and the extended pixel data received from the guide scale processing block 3140. The selector 3160 is further configured to, when selecting the base image pixel data, generate extended pixel data for the pixels of the base image by appending the process select bit ("0" in the shown embodiment) to the pixel data for each pixel of the base image, and to provide the generated extended pixel data to the display driver 2200 via the LVDS interface 3170. The selector 3160 is further configured to provide, when selecting the extended pixel data received from the icon processing block 3120 or the guide scale processing block 3140, the selected extended pixel data to the display driver 2200 via the LVDS interface 3170.

The embodiment shown in FIG. 22, which generates the extended pixel data including a process select bit and additional process select bits for each pixel of an icon, facilitates the application of appropriate image processes to the pixel data of each pixel of the icon while the icon is being moved.

Figure 23:
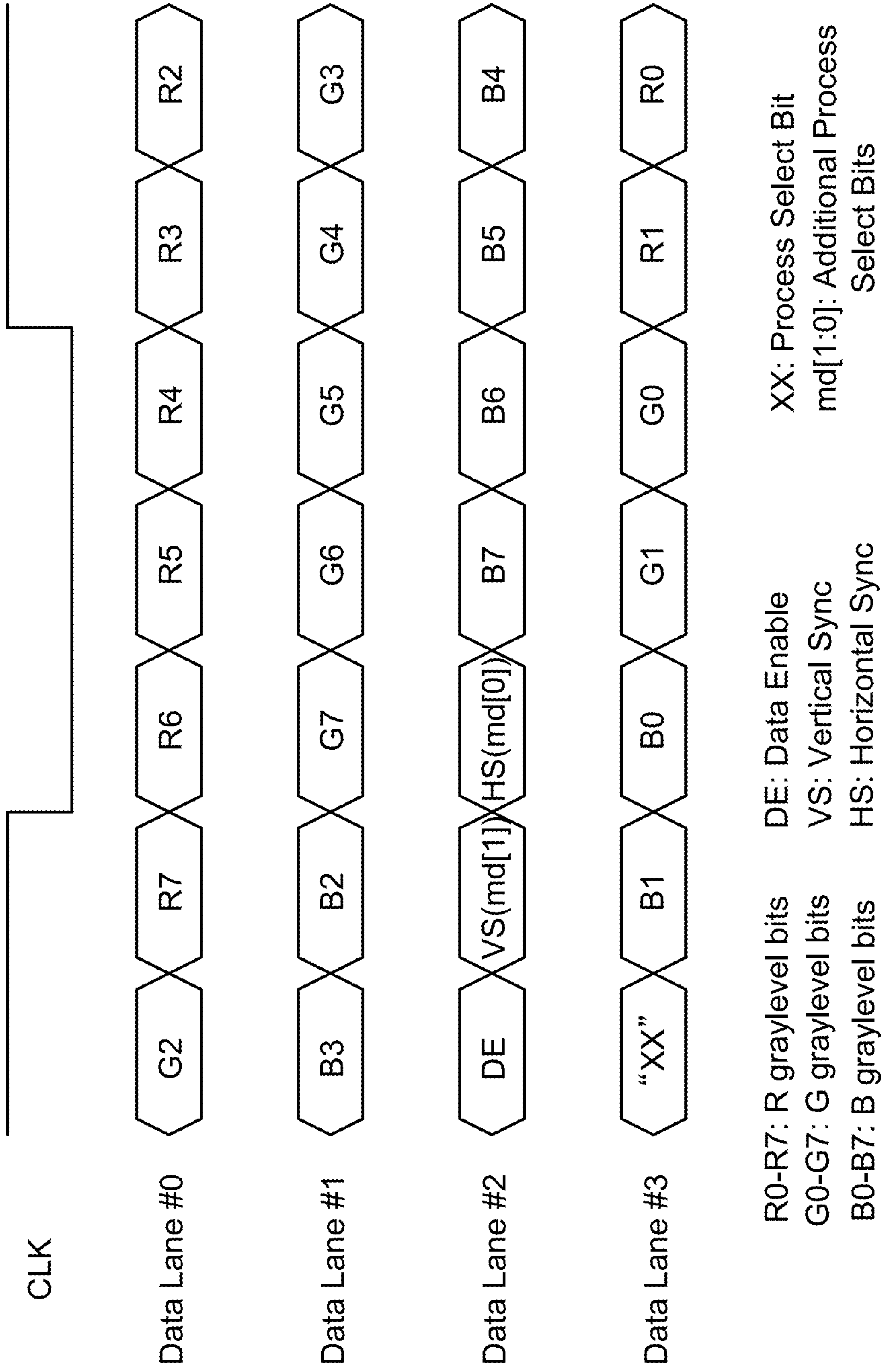
FIG. 23 shows another example format of extended pixel data, according to one or more embodiments.

FIG. 23 shows another example format of extended pixel data, according to one or more embodiments. In the shown embodiment, the extended pixel data is in the JEIDA format, except that the vertical synchronization bit VS and the horizontal synchronization bit HS are used as additional process bits md[1:0]. It should be noted that, in the JEIDA format, the operation of the display driver does not depend on the values of the vertical synchronization bit VS and the horizontal synchronization bit HS as long as the data enable bit DE is fixed to "1", although the JEIDA format and the VESA format recommend that the vertical synchronization bit VS and the horizontal synchronization bit HS be fixed to "1" during the clock cycles during which the pixel data are transmitted. In other embodiments, the extended pixel data may be in the VESA format, except that the vertical synchronization bit VS and the horizontal synchronization bit HS are used as additional process bits md[1:0].

In alternative embodiments, pixel data may be transmitted to a display driver (e.g., the display driver 200 shown in FIG. 2) in a data transfer format other than the JEIDA format and the VESA format. In one implementation, default pixel data may contain (p+1) R graylevel bits R[p:0], (p+1) G graylevel bits G[p;0], and (p+1) B graylevel bits B[p:0], where p is a natural number, e.g. 9. The display driver may be configured to receive default pixel data and drive a display panel based on the default pixel data. In some embodiments, the display driver may be configured to be adapted to extended pixel data that include bit-reduced pixel data, a process select bit, and additional process select bits m[*]. In such embodiments, the display driver may be configured to apply one or more processes to the bit-reduced pixel data based on the process select bit and additional process select bits m[*]. In one implementation, extended pixel data may include bit-reduced pixel data that contains R graylevel bits R[p-q:0], G graylevel bits G[p-q;0], and B graylevel bits B[p-q: 0], a process select bit, and additional process bits m[3q-2:0], where q is a natural number less than p. In implementations where p=9 and q=2, the extended pixel data includes R graylevel bits R[7:0], G graylevel bits G[7;0], and B graylevel bits B[7:0], a process select bit, and five additional process bits m[4:0]. The display driver may be configured to receive the extended pixel data and apply one or more processes to the bit-reduced pixel data based on the process select bit and the additional process bits m[3q-2:0].

Figure 24:
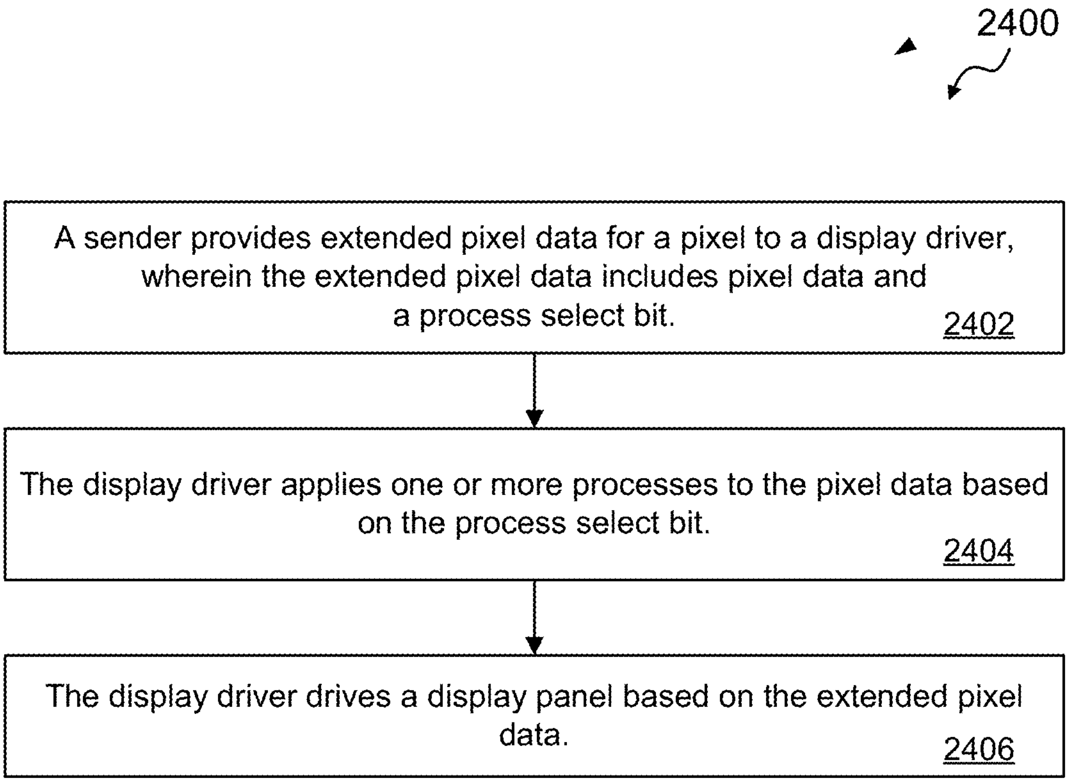
FIG. 24 is a flowchart of an exemplary process for driving a display panel, according to one or more embodiments.

FIG. 24 is a flowchart of an exemplary method 2400 for driving a display panel, according to one or more embodiments. The method 2400 may be performed by the display system 1000 shown in FIGS. 2, 3, 7, and 10, the display system 2000 shown in FIG. 19, or the display system 3000 shown in FIG. 22. However, it will be recognized that a display system that includes additional and/or fewer components as shown in FIGS. 2, 3, 7, 10, 19, and 22 may be used to perform the method 2400, that any of the following steps may be performed in any suitable order, and that the method 2400 may be performed in any suitable environment.

In step 2402, a sender (e.g., the sender 100 shown in FIGS. 2, 3, 7, and 10, the sender 2100 shown in FIG. 19, and the sender 3100 shown in FIG. 22) provides extended pixel data for a pixel to a display driver (e.g., the display driver 200 shown in FIGS. 2, 3, 7, and 10, and the display driver 2200 shown in FIGS. 19 and 22). The extended pixel data includes pixel data and a process select bit. In step 2404, the display driver applies one or more processes to the pixel data based on the process select bit. In step 2406, the display driver drives a display panel (e.g., the display panel 300 shown in FIGS. 2, 3, 7, 10, 19, and 22) based on the extended pixel data.

In some embodiments, applying the one or more processes to the pixel data may include applying an image process to the pixel data to generate processed pixel data, and driving the display panel may be based on the processed pixel data. The one or more processes may include a gamma transformation with a gamma setting determined based on a value of the process select bit. In some embodiments, applying the one or more processes to the pixel data comprises performing an error correction and/or detection process on the pixel data in response to the process select bit being a predetermined value.

In some embodiments, the extended pixel data may further include one or more additional process select bits. In such embodiments, the display driver may determine, based on the process select bit, that the extended pixel data further includes the one or more additional process select bits. The display driver is further configured to apply, based on the process select bit and the one or more additional process select bits, one or more processes to the pixel data contained in the extended pixel data.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display system, comprising: a sender configured to provide first extended pixel data for a first pixel, the first extended pixel data comprising: first pixel data; and a first process select bit; and a display driver configured to: receive the first extended pixel data; apply, based on the first process select bit, one or more first processes to the first pixel data, wherein applying the one or more first processes to the first pixel data comprises performing an error detection process on the first pixel data based on a value of the first process select bit; and drive a display panel based on the first extended pixel data, wherein a first value of the first process select bit indicates that the first pixel is a pixel of an icon.

2. The display system of claim 1, wherein applying the one or more first processes to the first pixel data further comprises applying an image process to the first pixel data to generate first processed pixel data, and wherein driving the display panel comprises driving the display panel based on the first processed pixel data.

3. The display system of claim 1, wherein the one or more first processes comprise a gamma transformation with a gamma setting based on a value of the first process select bit.

4. The display system of claim 1, wherein applying the one or more first processes to the first pixel data further comprises performing an error correction process on the first pixel data based on the value of the first process select bit.

5. The display system of claim 1, wherein the first extended pixel data is in the Japan electronic industry development association (JEIDA) format or the video electronics standards association (VESA) format, and wherein the first process select bit is transmitted to the display driver concurrently with a first data enable (DE) bit.

6. The display system of claim 1, wherein the sender is further configured to provide second extended pixel data for a second pixel, the second extended pixel data comprising:

second pixel data;

a second process select bit; and one or more additional process select bits;

wherein the display driver is further configured to:

receive the second extended pixel data;

determine, based on the second process select bit, that the second extended pixel data comprises the one or more additional process select bits; and apply, based on the second process select bit and the one or more additional process select bits, one or more second processes to the second pixel data, and wherein driving the display panel is further based on the second extended pixel data.

7. The display system of claim 6, wherein a number of bits of the second pixel data is less than a number of bits of the first pixel data.

8. The display system of claim 6, wherein the first pixel data of the first extended pixel data is in an RGB format, and wherein the second pixel data of the second extended pixel data is in a monochrome grayscale format.

9. The display system of claim 8, wherein the second pixel is a pixel of a grayscale image captured by a camera.

10. The display system of claim 6, wherein the one or more second processes comprise a gamma transformation with a gamma setting based on values of the second process select bit and the one or more additional process select bits.

11. The display system of claim 6, wherein applying the one or more second processes to the second pixel data comprises performing an error correction process and/or an error detection process on the second pixel data based on one or more values of the one or more additional process select bits.

12. The display system of claim 6, wherein the first extended pixel data is in the Japan electronic industry development association (JEIDA) format or the video electronics standards association (VESA) format, wherein the first process select bit of the first extended pixel data is transmitted to the display driver concurrently with a first data enable (DE) bit, wherein the second extended pixel data comprises a second DE bit in accordance with the JEIDA format or the VESA format; and wherein the second process select bit of the second extended pixel data is transmitted to the display driver concurrently with the second DE bit.

13. The display system of claim 1, wherein performing the error detection process is based on an error detection code which is part of the first extended pixel data.

14. The display system of claim 4, wherein performing the error correction process is based on an error correction code stored at the display driver.

15. A display driver, comprising: an interface configured to receive first extended pixel data for a first pixel, the first extended pixel data comprising: first pixel data; and a first process select bit; a pixel data processing circuit configured to apply, based on the first process select bit, one or more first processes to the first pixel data, wherein applying the one or more first processes to the first pixel data comprises performing an error detection process on the first pixel data based on a value of the first process select bit; and a driver circuit configured to drive a display panel based on the first extended pixel data, wherein a first value of the first process select bit indicates that the first pixel is a pixel of an icon.

16. The display driver of claim 15, wherein applying the one or more first processes to the first pixel data further comprises applying an image process to the first pixel data to generate first processed pixel data, and wherein driving the display panel comprises driving the display panel based on the first processed pixel data.

17. The display driver of claim 15, wherein the one or more first processes comprise a gamma transformation with a gamma setting based on a value of the first process select bit.

18. The display driver of claim 15, wherein applying the one or more first processes to the first pixel data further comprises performing an error correction process on the first pixel data based on the value of the first process select bit.

19. The display driver of claim 15, wherein the interface is further configured to receive second extended pixel data for a second pixel, the second extended pixel data comprising:

second pixel data;

a second process select bit; and one or more additional process select bits;

wherein the pixel data processing circuit is further configured to:

determine, based on the second process select bit, that the second extended pixel data comprises the one or more additional process select bits; and apply, based on the second process select bit and the one or more additional process select bits, one or more second processes to the second pixel data; and wherein driving the display panel is further based on the second extended pixel data.

20. A method, comprising: providing first extended pixel data for a first pixel to a display driver, the first extended pixel data comprising: first pixel data; and a first process select bit; applying, by the display driver, one or more first processes to the first pixel data based on the first process select bit, wherein applying the one or more first processes to the first pixel data comprises performing an error detection process on the first pixel data based on a value of the first process select bit; and driving, by the display driver, a display panel based on the first extended pixel data, wherein a first value of the first process select bit indicates that the first pixel is a pixel of an icon.

21. The method of claim 20, further comprising:

providing second extended pixel data for a second pixel to the display driver, the second extended pixel data comprising:

second pixel data;

a second process select bit; and one or more additional process select bits;

determining, based on the second process select bit, that the second extended pixel data comprises the one or more additional process select bits; and applying, by the display driver, one or more second processes to the second pixel data based on the second process select bit and the one or more additional process select bits;

wherein driving the display panel is further based on the second extended pixel data.

* * * * *